(12) United States Patent
Lim et al.

(10) Patent No.: US 12,287,031 B2
(45) Date of Patent: Apr. 29, 2025

(54) MOTOR ASSEMBLY

(71) Applicant: LG MAGNA E-POWERTRAIN CO., LTD., Incheon (KR)

(72) Inventors: Jungwook Lim, Incheon (KR); Deukhyun Hwang, Incheon (KR)

(73) Assignee: LG MAGNA E-POWERTRAIN CO., LTD., Incheon (KR)

( * ) Notice: Subject to any disclaimer, the term of this patent is extended or adjusted under 35 U.S.C. 154(b) by 0 days.

(21) Appl. No.: 18/730,227

(22) PCT Filed: Jan. 28, 2022

(86) PCT No.: PCT/KR2022/001546
§ 371 (c)(1),
(2) Date: Jul. 18, 2024

(87) PCT Pub. No.: WO2023/146002
PCT Pub. Date: Aug. 3, 2023

(65) Prior Publication Data
US 2025/0109786 A1    Apr. 3, 2025

(51) Int. Cl.
*F16H 57/04* (2010.01)
*F16H 37/08* (2006.01)
(Continued)

(52) U.S. Cl.
CPC ..... *F16H 57/0476* (2013.01); *F16H 37/0813* (2013.01); *F16H 57/021* (2013.01);
(Continued)

(58) Field of Classification Search
CPC .. F16H 57/0476; F16H 57/021; F16H 57/037; F16H 57/0423; F16H 57/0424;
(Continued)

(56) References Cited

U.S. PATENT DOCUMENTS

| 10,823,276 B2 | 11/2020 | Francis et al. |
| 2011/0298314 A1* | 12/2011 | Atarashi ............ H02K 9/19 310/54 |

(Continued)

FOREIGN PATENT DOCUMENTS

| BE | 504721 A | 8/1951 |
| KR | 10-2013-0027512 A | 3/2013 |

(Continued)

*Primary Examiner* — Timothy Hannon
(74) *Attorney, Agent, or Firm* — Birch, Stewart, Kolasch & Birch, LLP

(57) ABSTRACT

The present invention relates to a motor assembly comprising: a housing; a motor that is received at one side inside the housing in the axial direction; a gear train that is provided at the other side inside the housing in the axial direction; oil that is received inside the housing to be in contact with the gear train; and an oil storage unit that temporarily receives the oil moving upward when the gear train rotates, wherein the oil storage unit includes an oil outlet formed to discharge the oil received therein in a preset amount. Accordingly, the rotational resistance can be suppressed from increasing due to the oil received therein, and the oil can be continuously supplied (scattered) upward in a preset amount, and thus, continuous cooling can be achieved.

16 Claims, 20 Drawing Sheets

(51) Int. Cl.
  *F16H 57/021* (2012.01)
  *H02K 7/00* (2006.01)
  *H02K 7/116* (2006.01)
  *H02K 9/19* (2006.01)
  *F16H 57/02* (2012.01)
  *F16H 57/037* (2012.01)
(52) U.S. Cl.
  CPC ..... *F16H 57/0423* (2013.01); *F16H 57/0424* (2013.01); *F16H 57/045* (2013.01); *H02K 7/003* (2013.01); *H02K 7/116* (2013.01); *H02K 9/19* (2013.01); *F16H 2057/02034* (2013.01); *F16H 57/037* (2013.01); *F16H 57/0457* (2013.01); *F16H 57/0483* (2013.01)
(58) Field of Classification Search
  CPC ............. F16H 57/0427; F16H 57/0457; F16H 57/0483; F16H 2057/02034; H02K 7/116; H02K 7/003; H02K 9/19
  See application file for complete search history.

(56) References Cited

U.S. PATENT DOCUMENTS

2012/0286607 A1* 11/2012 Shimizu .............. F16H 57/0471
                                                                    310/90
2013/0145879 A1* 6/2013 Nakamura .......... F16H 57/0441
                                                                    74/467
2013/0278091 A1 10/2013 Ohashi et al.
2013/0283972 A1* 10/2013 Yamamoto .......... F16H 57/0486
                                                                    903/902
2015/0214817 A1 7/2015 Kim
2016/0153546 A1* 6/2016 Ogawa ................ F16H 57/0457
                                                                    74/665 F
2019/0181720 A1* 6/2019 Yamaguchi ............... H02K 5/04
2021/0262563 A1 8/2021 Sung et al.
2022/0037955 A1 2/2022 Wang et al.
2022/0282784 A1* 9/2022 Nakata ................ F16H 57/0424
2023/0184322 A1* 6/2023 Matsuda ............. F16H 57/0457
                                                                    74/467
2024/0266920 A1* 8/2024 Itaya ................... F16H 57/0495
2024/0313615 A1* 9/2024 Kosaka .................. H02K 7/116
2024/0401679 A1* 12/2024 Katayama ............. F16H 57/045

FOREIGN PATENT DOCUMENTS

KR    10-2015-0089469 A    8/2015
KR    10-2021-0102522 A    8/2021
KR    10-2021-0107406 A    9/2021
KR    10-2021-0144937 A    11/2021

* cited by examiner

MOTOR ASSEMBLY

CROSS-REFERENCE TO RELATED APPLICATIONS

This application is the National Stage filing under 35 U.S.C. 371 of International Application No. PCT/KR2022/001546 filed on Jan. 28, 2022, which is hereby expressly incorporated by reference into the present application.

TECHNICAL FIELD

The present disclosure relates to a motor assembly.

BACKGROUND ART

As is well known, a motor is an apparatus that converts electric energy into mechanical energy.

Such motors typically include a stator and a rotor configured to rotate around a rotational shaft with respect to the stator.

Some of the motors are implemented as traction motors that are disposed in vehicles and used as a driving source that provides power or an auxiliary power source that assists power.

The traction motor is configured to include a housing, a motor accommodated on one side inside the housing, and a gear train accommodated on one side of the motor inside the housing.

Oil is stored inside the housing for lubrication of the gear train.

The oil is scattered inside the housing by centrifugal force when the gear train rotates, and when the oil comes into contact with a component having a relatively high temperature, it also provides a cooling effect to cool the component having the relatively high temperature.

Meanwhile, when the gear train rotates, the oil inside the housing is brought into contact with the gear train and is scattered inside the housing by centrifugal force, and thereby an oil level inside the housing is lowered. On the other hand, when the oil scattered to an upper area inside the housing falls, the oil level rises.

However, in the related art motor having the gear train, there is a problem that as oil increases inside the housing, rotational resistance increases while rotating a plural number of times, and thereby the output of the motor is impeded.

In consideration of this, if an amount of oil filled inside the housing is reduced, lubrication of the oil becomes dissatisfied, which causes a problem that forced wear is likely to increase.

In addition, when the level of oil inside the housing is lowered, the amount of oil transported upward by the gear train is reduced, and thereby cooling for the gear train is insufficient. This causes a problem that the forced wear of the gear train is likely to further increase.

In particular, the frequent changes in the level of oil inside the housing increase the range of change in the amount of oil moved upward by the gear train, making it difficult to achieve uniform lubrication and continuous cooling by the oil.

DISCLOSURE OF INVENTION

Technical Problem

Therefore, an aspect of the present disclosure is to provide a motor assembly that is capable of suppressing a generation of rotational resistance due to a high level of oil when a gear rotates.

Another aspect of the present disclosure is to provide a motor assembly in which oil inside a housing can uniformly move upward when a gear rotates.

Still another aspect of the present disclosure is to provide a motor assembly in which oil can be supplied to a stator when a gear rotates.

Another aspect of the present disclosure is to provide a motor assembly in which oil can be supplied to a bearing when a gear rotates.

Another aspect of the present disclosure is to provide a motor assembly that is capable of reducing rotational resistance when a gear rotates and promoting cooling of the gear, a stator, and a bearing.

Solution to Problem

A motor assembly according to the present disclosure to solve the problems to be solved, described above, has a technical feature in that oil moved upward by rotation of a gear moves downward via an oil storage part where the oil is temporarily stored.

More specifically, a motor may be disposed on one side inside a housing, and a gear train and oil in contact with the gear train may be accommodated on another side in the housing, an oil storage part in which oil upwardly moved during rotation of the gear train is temporarily accommodated may be disposed inside the housing, and the oil storage part may include an oil outlet through which oil therein is discharged by a preset amount, whereby a level of oil inside the housing can be lowered to a preset level during rotation of the gear and the preset level can be maintained continuously.

In one embodiment of the present disclosure, the oil storage part includes a gear-side oil storage part disposed on one side of the gear train.

Accordingly, a level of oil in contact with the gear train can be lowered, thereby reducing rotational resistance when the gear train rotates.

In addition, a preset level can be continuously maintained by oil that continuously flows out from the gear-side oil storage part, so that an almost uniform amount of oil can move upward during rotation of the gear, thereby continuously and evenly lubricating and cooling the gear train.

In one embodiment of the present disclosure, the oil storage part includes a motor-side oil storage part that is disposed on one side of the motor and supplies oil toward a stator of the motor.

Accordingly, oil can be supplied to the stator when the gear rotates, thereby promoting cooling of the stator.

The motor-side oil storage part includes an oil supply passage through which oil is supplied to bearings.

This can facilitate cooling and lubrication of the bearing.

In one embodiment of the present disclosure, the gear train includes a driving gear disposed on a rotor shaft of the motor, and a counter gear engaged with the driving gear, and the oil storage part includes a counter gear oil storage portion disposed below the counter gear to store oil.

This can facilitate cooling and lubrication of the counter gear and driving gear when the gear train rotates.

A motor assembly according to one embodiment of the present disclosure includes a motor that is accommodated on one side in the housing along an axial direction, a gear train that is disposed on another side in the housing along the axial direction, oil that is accommodated inside the housing and brought into contact with the gear train, and an oil storage part that temporarily stores some of oil moved upward when the gear train rotates, wherein the oil storage part includes an oil outlet that is formed to allow the oil stored therein to flow out by a preset amount.

Accordingly, when the gear train rotates, the oil inside the housing can move upward, and some of the upwardly moved oil can be accommodated inside the oil storage part, thereby lowering a level of oil inside the housing to a preset level.

This can result in reducing rotational resistance caused by the oil when the gear train rotates.

In addition, the oil inside the oil storage part can be continuously discharged through the oil outlet by a preset amount, so that the oil inside the housing can be continuously maintained at a preset level.

Accordingly, a constant amount of oil can move upward when the gear train rotates, so that cooling and lubrication of the gear train can be maintained uniformly and continuously.

In one embodiment of the present disclosure, the motor includes: a stator; and a rotor that has a rotor shaft and is disposed to be rotatable with respect to the stator.

The housing includes: a main housing in which the stator is accommodated; and a gear housing in which the gear train is accommodated.

The oil storage part includes a gear-side oil storage part disposed inside the gear housing.

Accordingly, when the gear train rotates, some of the oil inside the housing can be accommodated inside the gear-side oil storage part, thereby lowering a level of oil inside the housing, resulting in reducing rotational resistance caused by the oil when the gear train rotates.

In one embodiment of the present disclosure, the gear-side oil storage part includes: an oil accommodation space that is formed in an arcuate shape with one side open in the axial direction, and has one side disposed above the gear housing and another side disposed below the gear housing; and an oil cover that is coupled to block the opening of the oil accommodation space.

Here, the oil accommodation space is formed so that a side thereof toward the motor is open.

The oil cover is coupled to block the opening of the oil accommodation space.

In one embodiment of the present disclosure, the oil cover includes an oil inlet that communicates with a top of the oil accommodation space, and the oil outlet is formed in the oil cover to communicate with a bottom of the oil accommodation space.

As a result, when the gear train rotates, some of oil scattered by centrifugal force of oil in contact with the gear train flows into the gear-side oil storage part through the oil inlet, and the oil inside the gear-side oil storage part moves to the bottom of the gear train through the oil outlet.

Here, the oil inlet has a larger flow area than the oil outlet.

Accordingly, a level of oil inside the housing can be lowered by an amount of oil stored in the gear-side oil storage part.

In one embodiment of the present disclosure, the gear housing includes a guide rib that has one side disposed above the gear train and another side disposed above the oil accommodation space.

Accordingly, some of oil scattered by the gear train when the gear train rotates can move into the gear-side oil storage part along the guide rib.

Here, the guide rib includes a first section disposed above the gear train in the axial direction, a second section disposed in the oil accommodation space in the axial direction, and a connection section connecting the first section and the second section.

In one embodiment of the present disclosure, the first section and the second section are disposed with a height difference, and the connection section is inclined with respect to a radial direction.

Accordingly, oil scattered in the first section can easily move to the second section through the inclined section.

In one embodiment of the present disclosure, the oil storage part includes a motor-side oil storage part disposed on a top inside the main housing, and the motor-side oil storage part extends along the axial direction.

Here, a bottom of the motor-side oil storage part is formed at a position higher than a center of the stator, and extends along the axial direction to correspond to a length of the stator.

The oil outlet is formed in the motor-side oil storage part to be open toward the stator.

Accordingly, when the gear train rotates, oil inside the motor-side oil storage part can fall to an upper area of an outer circumferential surface of the stator through the oil outlet, and the oil that has fallen on the outer circumferential surface of the stator can facilitate cooling of the stator while falling along the outer circumferential surface of the stator.

In one embodiment of the present disclosure, the main housing includes an inner wall that partitions a gear accommodating part to accommodate the gear train and a motor accommodating part to accommodate the motor, and the motor-side oil storage part includes: a through hole that is formed through the inner wall; an oil collecting portion that is disposed below the through hole inside the gear accommodating part to collect oil and allows the collected oil to be discharged through the through hole; and an oil accommodating portion that is disposed inside the motor accommodating part and accommodates oil discharged through the through hole.

Accordingly, oil scattered during rotation of the gear train is collected by the oil collecting portion and moves to the oil accommodating portion through the through hole.

In one embodiment of the present disclosure, the oil accommodating portion includes a bottom surface portion formed at a higher position than a center of the rotor shaft, and a side wall portion extending upward from the bottom surface portion and spaced apart from an upper surface of the main housing to form the oil outlet.

Here, the oil outlet is formed at a lower position than a lower portion of the through hole.

Accordingly, when the gear train rotates, oil can be continuously supplied to the stator through the oil outlet, and the stator (stator core) can be continuously cooled by the continuously supplied oil.

In one embodiment of the present disclosure, the rotor shaft includes rotor shaft bearings disposed on both sides along the axial direction, and the motor-side oil storage part includes an oil supply passage to supply oil to the rotor shaft bearings.

As a result, oil can be continuously supplied to the rotor shaft bearings when the gear train rotates.

Accordingly, the rotor shaft bearings can be continuously cooled and lubricated by the continuous oil supply.

In one embodiment of the present disclosure, the oil supply passage is formed to be inclined downward, and an inlet side of the oil supply passage is connected to communicate with a bottom of the oil storage part, and an outlet side of the oil supply passage is connected to communicate with an upper area of the rotor shaft bearing.

Accordingly, oil in the gear-side oil storage part can naturally move to the rotor shaft bearing area by gravity.

In one embodiment of the present disclosure, the oil supply passage includes a communication hole communicating with outside.

Here, the communication hole extends higher than the oil supply passage.

This can suppress leakage of oil inside the oil supply passage to the outside through the communication hole.

In one embodiment of the present disclosure, the oil supply passage is formed to be inclined downward, and an inlet side of the oil supply passage is connected to communicate with a bottom of the oil storage part, and an outlet side of the oil supply passage is connected to communicate with an upper area of the rotor shaft bearing.

The inner shaft extends to outside of the rotor shaft, and the inner shaft includes an inner shaft bearing.

Here, the inner shaft bearing is disposed outside the rotor shaft at a position spaced apart from the rotor shaft along the axial direction.

The main housing includes a bearing accommodating part in which the rotor shaft bearing and the inner shaft bearing are accommodated, and the oil supply passage has an oil outlet communicating with the bearing accommodating part.

Accordingly, oil in the motor-side oil storage part moves to the bearing accommodating part via the oil supply passage.

In one embodiment of the present disclosure, the bearing accommodating part includes a rotor shaft bearing accommodating portion in which the rotor shaft bearing is accommodated, an inner shaft bearing accommodating portion in which the inner shaft bearing is accommodated, and a partition portion partitioning the rotor shaft bearing accommodating portion and the inner shaft bearing accommodating portion, the partition portion includes a cutout portion formed by removing a partial section thereof in the circumferential direction, and the oil outlet is formed in the cutout portion.

Accordingly, oil discharged through the oil outlet can move to both sides of the partition portion (the rotor shaft bearing accommodating portion and the inner shaft bearing accommodating portion).

In one embodiment of the present disclosure, the partition portion includes a separation rib that protrudes along the radial direction and extends along the circumferential direction, such that oil introduced through the oil outlet flows separately into the rotor shaft bearing accommodating portion and the inner shaft bearing accommodating portion.

Accordingly, oil supplied through the oil outlet can move more uniformly to the rotor shaft bearing accommodating portion and the inner shaft bearing accommodating portion.

In one embodiment of the present disclosure, the gear train includes a driving gear disposed on the rotor shaft, a counter gear engaged with the driving gear, a power transmission gear coaxially coupled to the counter gear, and a main gear engaged with the power transmission gear, and the oil storage part includes a counter gear oil storage portion disposed below the counter gear and accommodating oil therein.

This can facilitate cooling and lubrication of the counter gear.

This can also facilitate cooling and lubrication of the driving gear that rotates in engagement with the counter gear.

In one embodiment of the present disclosure, the counter gear oil storage portion includes a bottom surface portion formed in an arcuate shape and disposed with being spaced apart from an outer periphery of the counter gear, and both side wall portions extending from both sides of the bottom surface portion in a radial direction to form an oil storage space therein.

Accordingly, a relatively great amount of oil can be accommodated inside the counter gear oil storage portion, thereby further facilitating cooling and lubrication of the counter gear.

In one embodiment of the present disclosure, the gear train further includes a gear shaft having the counter gear and the power transmission gear, and a gear shaft bearing that rotatably supports the gear shaft.

Accordingly, the gear shaft can be rotatably supported.

The gear housing includes a gear shaft bearing accommodating portion in which the gear shaft bearing is accommodated, and the oil storage part includes an oil supply part disposed above the gear shaft bearing accommodating portion.

Accordingly, oil can be supplied into the housing.

A guide part is disposed below the oil supply part to guide oil dropped from the oil supply part to the gear shaft bearing accommodating portion.

An oil hole is disposed on one side of the guide part so that oil can flow into the gear shaft bearing accommodating portion therethrough.

The oil supply part includes an oil accommodation space that is formed above the gear shaft bearing accommodating portion and has an end portion facing the motor open along the axial direction, and a cover that is coupled to block the opening of the oil accommodation space.

An oil supply hole through which oil can be supplied is formed through an outer wall of the oil accommodation space.

An oil outlet through which oil flows out is formed through a bottom surface portion of the oil accommodation space.

A plurality of ribs extending in a vertical direction are disposed inside the oil accommodation space.

The plurality of ribs include a lower rib extending upward from the bottom surface portion of the oil accommodation space and an upper rib extending downward from an upper surface portion of the oil accommodation space.

The upper surface portion of the oil accommodation space is formed to be spaced a certain distance apart from an upper surface portion of the gear housing.

A through hole is formed through the upper surface portion of the oil accommodation space.

Accordingly, oil on the upper surface portion of the oil accommodation space can flow into the oil accommodation space through the through hole.

Additionally, oil in the oil accommodation space can be discharged out of the oil accommodation space through the through hole.

Advantageous Effects of Invention

As described above, according to one embodiment of the present disclosure, an oil storage part that temporarily accommodates oil moved upward when a gear train rotates may be formed, thereby lowering a level of oil inside a housing and thus reducing rotational resistance due to the oil.

In addition, the oil storage part has an oil outlet through which oil flows out at a preset flow rate (by a preset amount), so that a constant amount of oil can be continuously supplied to the gear train, which can result in uniformly and continuously cooling and lubricating the gear train.

In addition, the oil storage part includes a gear-side oil storage part having an arcuate shape inside a gear housing. Accordingly, oil moved upward when the gear train rotates can be stored in the gear-side oil storage part, thereby lowering a level of oil inside the housing.

In addition, the gear housing has a guide rib having one side disposed above the gear train and another side disposed inside a gear-side oil storage part. Accordingly, an amount of oil scattered to an inner wall (upper part, top) of the gear housing during rotation of the gear train can be reduced.

Additionally, the guide rib includes a first section disposed above the gear train in the axial direction, a second section disposed in the oil accommodation space in the axial direction, and a connection section connecting the first section and the second section, such that a greater amount of oil scattered during rotation of the geartrain can move toward the oil accommodation space.

In addition, the first section and the second section are disposed with a height difference, and the connection section is formed to be inclined with respect to a radial direction. Accordingly, oil which has been scattered and adhered on the first section during the rotation of the gear train can easily move to the second section.

This can result in collecting more oil in the oil accommodation space.

In addition, the oil storage part includes a motor-side oil storage part disposed on a top inside a main housing, the motor-side oil storage part extends in an axial direction, and the oil outlet is disposed in the motor-side oil storage part to be open toward a stator, such that some of oil scattered during the rotation of the gear train can be supplied to the stator so as to cool the stator.

In addition, the motor-side oil storage part includes a through hole formed through an inner wall of the main housing, an oil collecting portion disposed below the through hole in a gear accommodating part to collect oil therein, and an oil accommodating portion disposed below the through hole in a motor accommodating part to accommodate oil therein, such that some of oil scattered during rotation of the gear train can be collected by the oil collecting portion and easily move to the oil accommodating portion through the through hole.

In addition, the oil accommodating portion includes a bottom surface portion formed at a position higher than a center of the rotor shaft, and side wall portions extending upward from the bottom surface portion and spaced apart from an upper surface of the main housing to form the oil outlet, such that some of oil scattered during rotation of the gear train can be supplied to the stator through the oil outlet. This can facilitate cooling of the stator.

In addition, the motor-side oil storage part includes an oil supply passage through which oil is supplied to a rotor shaft bearing, so that oil scattered during rotation of the gear train can be supplied to the rotor shaft bearing, thereby promoting cooling and lubrication of the rotor shaft bearing.

In addition, the rotor shaft has an inner shaft therein, the inner shaft has an inner shaft bearing, the main housing includes a bearing accommodating part to accommodate the rotor shaft bearing and the inner shaft bearing, and the oil supply passage has an oil outlet communicating with the bearing accommodating part, such that some of oil scattered during rotation of the gear train can be transmitted to each of the rotor shaft bearing and the inner shaft bearing.

In addition, the bearing accommodating part includes a rotor shaft bearing accommodating portion, an inner shaft bearing accommodating portion, and a partition portion, the partition portion has a cutout portion formed by cutting out one section thereof in a circumferential direction, and the oil outlet is formed in the cutout portion, such that oil in the oil supply passage can be supplied to both sides of the partition portion.

In addition, the partition portion includes a separation rib that protrudes in a radial direction and extends in the circumferential direction to separate oil introduced through the oil outlet into the rotor shaft bearing accommodating portion and the inner shaft bearing accommodating portion, such that oil supplied through the oil supply passage can be more uniformly supplied to the rotor shaft bearing accommodating portion and the inner shaft bearing accommodating portion.

In addition, the oil storage part includes a counter gear oil storage portion that is disposed below a counter gear engaged with a driving gear disposed on the rotor shaft and accommodates oil therein, which can facilitate cooling and lubrication of the counter gear and the driving gear.

MODE FOR THE INVENTION

Hereinafter, embodiments disclosed in this specification will be described in detail with reference to the accompanying drawings. In this specification, the same or equivalent components may be provided with the same or similar reference numbers even in different embodiments, and description thereof will not be repeated. A singular representation used herein may include a plural representation unless it represents a definitely different meaning from the context. In describing the present invention, if a detailed explanation for a related known technology or construction is considered to unnecessarily divert the gist of the present disclosure, such explanation has been omitted but would be understood by those skilled in the art. It should be noted that the attached drawings are provided to facilitate understanding of the embodiments disclosed in this specification, and should not be construed as limiting the technical idea disclosed in this specification by the attached drawings.

Figure 1:
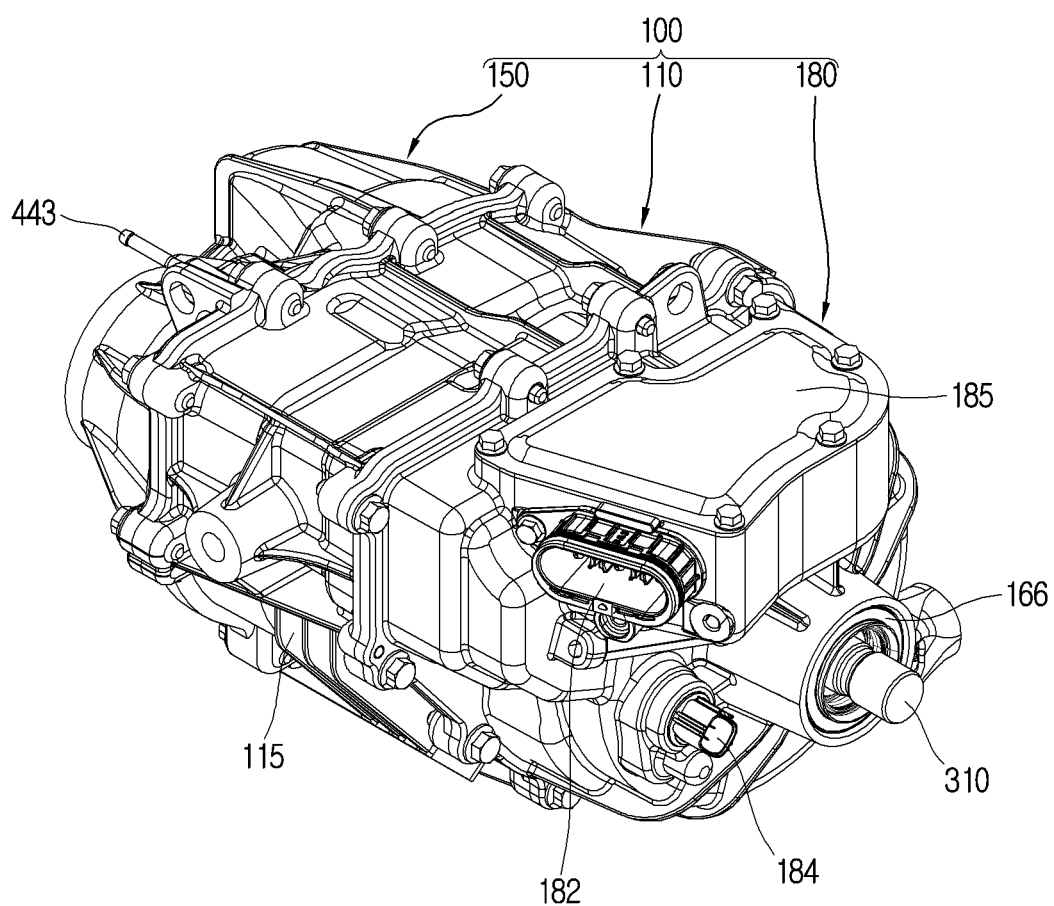
FIG. 1 is a perspective view illustrating appearance of a motor assembly in accordance with one embodiment of the present disclosure.
Figure 2:
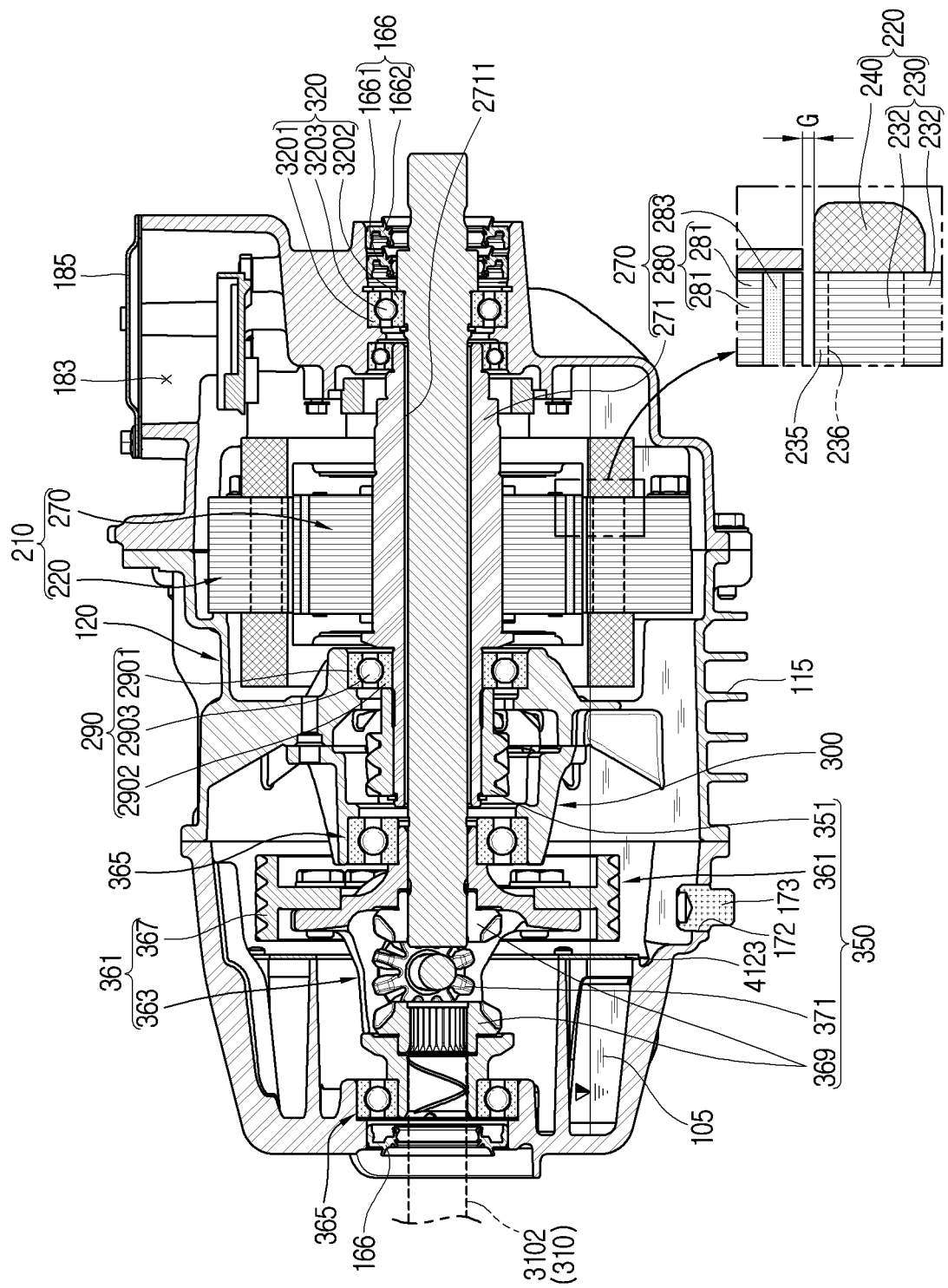
FIG. 2 is a cross-sectional view illustrating the motor assembly of FIG. 1.
Figure 3:
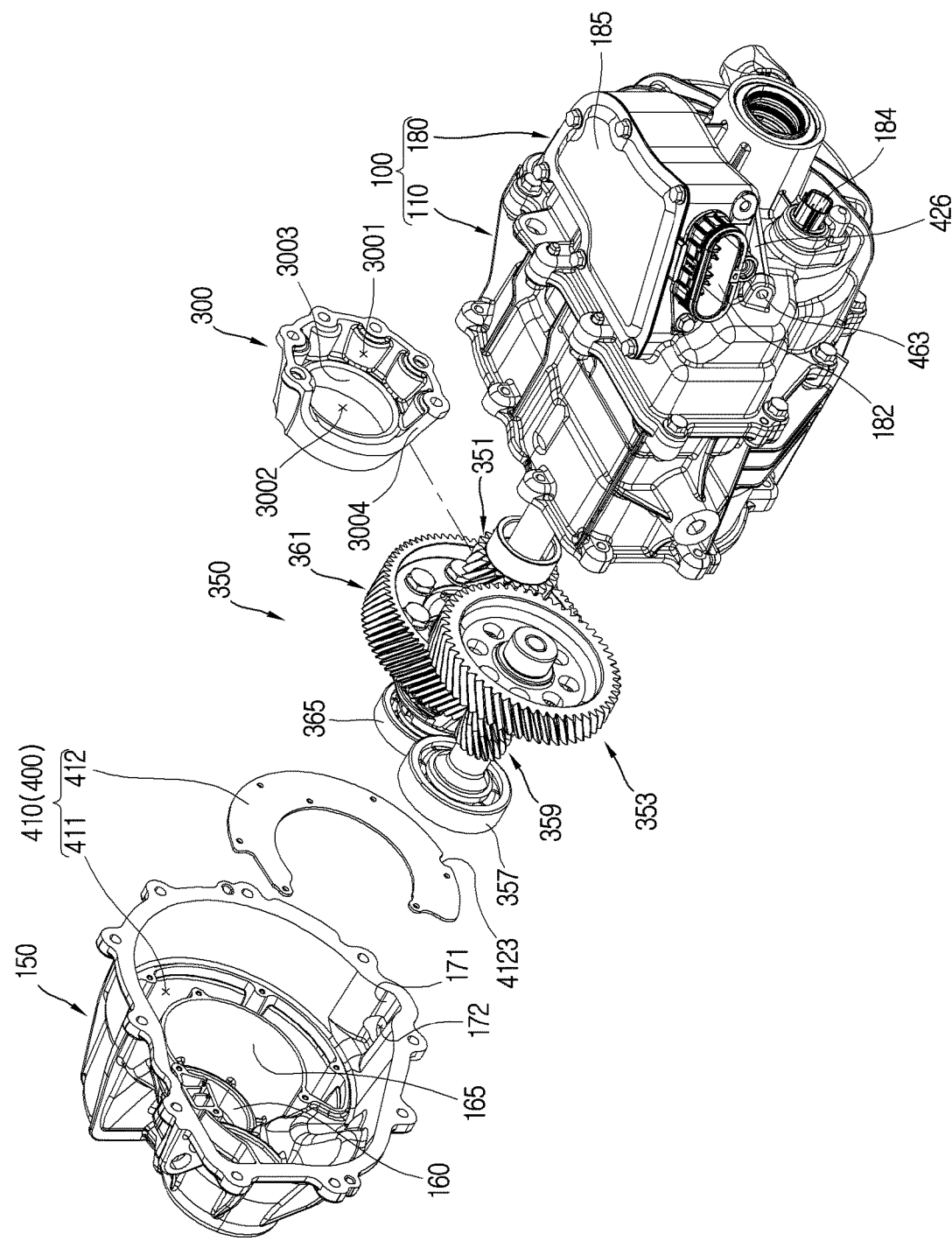
FIG. 3 is an exploded perspective view illustrating the motor assembly of FIG. 1.

FIG. 1 is a perspective view illustrating appearance of a motor assembly in accordance with one embodiment of the present disclosure, FIG. 2 is a cross-sectional view illustrating the motor assembly of FIG. 1, and FIG. 3 is an exploded perspective view illustrating the motor assembly of FIG. 1. As illustrated in FIGS. 1 to 3, a motor assembly according to one embodiment of the present disclosure may include a housing 100, a motor 210, a gear train 350, an oil 105, and an oil storage part 400.

An accommodation space is formed inside the housing 100.

The motor 210 is disposed on one side inside the housing 100.

The motor 210 includes, for example, a stator 220 and a rotor 270 having a rotor shaft 271 and disposed to be rotatable relative to the stator 220.

The gear train 350 is disposed on another side inside the housing 100 in an axial direction.

Here, the axial direction refers to a direction parallel to the rotor shaft 271.

For example, the gear train 350 may be connected to the rotor shaft 271 and configured to convert rotational force of the rotor shaft 271 with a certain gear ratio and output the converted rotational force to outside.

The motor assembly according to the embodiment of the present disclosure is disposed in a vehicle and may be implemented as a drive source for supplying power to the vehicle or an auxiliary power source that supplements power of an engine.

The motor assembly according to the embodiment of the present disclosure may be disposed, for example, along left and right directions of the vehicle.

In the embodiment of the present disclosure, the housing 100 may be disposed in the left and right directions.

The housing 100 includes, for example, a main housing 110 in which the motor 210 is accommodated and a gear housing 150 in which the gear train 350 is accommodated.

A plurality of fastening member coupling portions 152 and 112, to which a plurality of fastening members 154 are coupled, are formed in a mutual contact area between the main housing 110 and the gear housing 150. For example, the plurality of fastening members 154 may be implemented as bolts each having a male thread portion, and the fastening member coupling portions may be provided with female thread portions.

A motor accommodating part in which the motor 210 is accommodated is formed on one side inside the main housing 110.

A portion of a gear accommodating part in which a portion of the gear train 350 is accommodated is formed on another side inside the main housing 110.

The main housing 110 includes therein an inner wall 120 that partitions the motor accommodating part and the gear accommodating part.

The main housing 110 has a shape in which both sides are open along the axial direction.

The main housing 110 includes a cover housing 180 coupled to the opening disposed toward the motor accommodating portion. A plurality of fastening member coupling portions 181, to which a plurality of fastening members 114 are coupled, are formed in a mutual contact area between the main housing 110 and the cover housing 180.

The motor accommodating part is formed inside the main housing 110 and the cover housing 180.

The gear accommodating part is formed inside the main housing 110 and the gear housing 150.

The oil 105 is stored inside the housing.

The oil 105, for example, may be filled at a preset level inside the housing 100.

In the embodiment of the present disclosure, the preset level of the oil 105 may be set such that some of the oil 105 can always come into contact with a main gear 361 of the gear train 350 to be explained later, in a state of being temporarily stored in the oil storage part 400, when the gear train 350 rotates.

The stator 220 may include, for example, a stator core 230 and a stator coil 240 wound around the stator core 230.

In the embodiment of the present disclosure, the stator coil 240 may be configured to receive three-phase AC power.

The housing 100 includes a power connection connector 182 by which the stator coil 240 can be connected to an external power source (for example, an inverter). The power connection connector 182 is disposed, for example, on the cover housing 180. A penetration portion 183 may be formed upwardly through an upper surface of the cover housing 180. The penetration portion 183 may be formed on one side of the power connection connector 182. An inner end portion of the power connection connector 182 may be exposed to the penetration portion 183. Accordingly, the stator coil 240 and the power connection connector 182 can be electrically connected to each other. The gear housing 150 may include a penetration portion cover 185 for opening and closing the penetration portion. The penetration portion cover 185 is detachably coupled to the gear housing 150 by a plurality of fastening members 186.

The housing 100 includes a control connector 184 by which the motor 210 can be communicatively connected to a controller which is not illustrated. The control connector 184 is disposed on the cover housing 180. The control connector 184 may be disposed below the power connection connector 182.

A rotor accommodation hole in which the rotor 270 can be rotatably accommodated may be formed inside the stator core 230.

The rotor accommodation hole is formed through the stator core 230 along the axial direction.

The stator core 230 may be configured such that a plurality of electrical steel sheets 232 are stacked in an insulating manner.

The stator core 230 includes a plurality of teeth 235 and a plurality of slots 236 alternately formed along a circumference of the rotor accommodation hole.

For example, the stator coil 240 includes a plurality of phase coils connected to phases (U-phase, V-phase, and W-phase) of the three-phase AC power supply, respectively.

Although not specifically illustrated in the drawings, each of the plurality of phase coils may be configured, for example, by electrically connecting a plurality of conductor segments inserted into the slots 236.

The rotor 270 includes, for example, the rotor shaft 271 and a rotor core 280 rotating around the rotor shaft 271.

For example, the rotor core 280 may include a plurality of permanent magnets 283 in which different magnetic poles (N pole, S pole) are alternately arranged along a circumferential direction.

For example, the rotor core 280 may include a plurality of permanent magnet insertion portions formed therethrough along the axial direction so that the plurality of permanent magnets 283 can be inserted along the axial direction.

The rotor core 280 may have end plates disposed on both end portions along the axial direction. Accordingly, the plurality of permanent magnets 283 can be suppressed from being separated from the rotor core 280 along the axial direction.

The rotor shaft 271 is configured to protrude from the both end portions of the rotor core 280 along the axial direction.

The rotor shaft 271 may be rotatably supported by rotor shaft bearings 290.

The rotor shaft bearings 290 may be disposed on both sides of the rotor core 280 along the axial direction.

The rotor shaft bearings 290 may be disposed on both end portions of the rotor shaft 271.

The rotor shaft bearing 290 is implemented as a ball bearing, for example.

Specifically, the rotor shaft bearing 290 includes, for example, an outer ring 2901, an inner ring 2902 concentrically disposed at an inner side of the outer ring 2901, and a plurality of balls 2903 disposed between the outer ring 2901 and the inner ring 2902.

The rotor shaft 271, for example, is configured to have a through hole 2711 formed through the inside thereof along the axial direction.

An inner shaft 310 is rotatably accommodated inside the rotor shaft 271.

The inner shaft 310 has a length longer than that of the rotor shaft 271.

The inner shaft 310 protrudes to both sides of the rotor shaft 271 along the axial direction.

The inner shaft 310 may be rotatably supported by inner shaft bearings 320.

The inner shaft bearings 320 are disposed on areas protruding to the both sides of the rotor shaft 271 along the axial direction.

The inner shaft bearing 320 includes, for example, an outer ring 3201, an inner ring 3202 concentrically disposed at an inner side of the outer ring 3201, and a plurality of balls 3203 disposed between the outer ring 3201 and the inner ring 3202.

A sealant (oil seal) 166 to suppress leakage of the oil 105 is disposed on one end portion of the inner shaft 310.

The sealant 166, for example, may include a first sealant 1661 and a second sealant 1662 spaced apart from each other in the axial direction.

Meanwhile, a penetration portion 126 through which the rotor shaft 271 can pass is formed through the inner wall 120 of the main housing 110.

Rotor shaft bearing accommodating portions are formed in the inn wall 120 to accommodate the rotor shaft bearings 290.

A through hole 132 is formed through the inner wall 120 to correspond to the recess portion 131. Accordingly, the oil 105 can move between the motor accommodating part and the gear accommodating part.

In another side of the main housing 110 (actually, the cover housing 180) along the axial direction, a bearing accommodating part 190 in which the rotor shaft bearing 290 and the inner shaft bearing 320 are accommodated is formed.

A sealant coupling portion to which the sealant 166 is coupled in an accommodating manner is formed on one side (outside in the drawing) of the bearing accommodating part 190 along the axial direction of the main housing 110.

An outlet 172 is disposed in the bottom of the housing 100 (the gear housing 150) so that the oil 105 inside the housing 100 can be discharged to the outside. Specifically, the outlet 172 is formed through a bottom surface of the gear housing 150. A recess portion 171 that is recessed downward is disposed in the bottom of the gear housing 150. The recess portion 171 may be located, for example, on the lowest position of the bottom surface of the housing 100. With this configuration, the oil 105 inside the housing 100 can be collected inside the recess portion 171. The outlet 172 is formed through the bottom of the recess portion 171 in a vertical (up-to-down) direction. As a result, the oil 105 in the housing 100 can be fully discharged through the outlet 172 without remaining in the housing 100. An opening and closing member 173 for opening and closing the outlet 172 is disposed in the outlet 172.

A plurality of heat dissipation fins 115 are disposed on the bottom of the housing 100 to increase a surface area. The plurality of heat dissipation fins 115 are, for example, disposed on the main housing 110.

For example, the plurality of heat dissipation fins 115 may protrude from the outer surface of the main housing 110 and may be spaced apart from one another along the axial direction. The plurality of heat dissipation fins 115 may protrude downward from the bottom surface of the main housing 110. This can promote cooling of the oil on the bottom inside the housing 100.

Meanwhile, the housing 100 includes therein an oil storage part 400 in which some of the oil 105, which has moved upward during the rotation of the gear train 350, are temporarily stored.

As a result, a level of the oil 105 inside the housing 100 (a height of the level of the oil 105 inside the housing 100) can be lowered.

With this configuration, rotational resistance due to the level of the oil 105 can be reduced when the gear train 350 rotates.

The gear train 350 includes, for example, a driving gear 351 disposed on the rotor shaft 271, a counter gear 353 engaged with the driving gear 351, a power transmission gear 359 coaxially coupled to the counter gear 351, and a main gear 361 engaged with the power transmission gear 359.

The driving gear 351 has a slightly more enlarged outer diameter than the rotor shaft 271. The counter gear 353 is implemented to have a more enlarged outer diameter than the driving gear 351. The power transmission gear 359 is configured to have a smaller outer diameter than the counter gear 353.

The power transmission gear 359, for example, may have a smaller outer diameter than the driving gear 351. The main gear 361 is configured to have a more enlarged outer diameter than the power transmission gear 359. The main gear 361, for example, may have a larger outer diameter than the counter gear 353.

Here, the driving gear 351, the counter gear 353, the power transmission gear 359, and a ring gear 367 of the main gear 361 may each be implemented as helical gears, for example.

The main gear 361 is disposed on one side (a left side in the drawing) of the rotor shaft 271.

The main gear 361 includes, for example, a main gear body 363 having an inner accommodation space and a ring gear 367 coupled to the main gear body 363. The ring gear 367 has a ring shape.

The main gear body 363 is disposed on one side of the rotor shaft 271 to extend along the axial direction.

Main gear bearings 365 are disposed on both end portions of the main gear body 363 along the axial direction. Accordingly, both end portions of the main gear 361 can be rotatably supported. The main gear bearing 365, for example, may be implemented as a ball bearing.

A pair of sun gears 369 that are spaced apart from each other in the axial direction are disposed inside the main gear body 363. The pair of sun gears 369 are each rotatably coupled to the main gear body 363.

A pair of planetary gears 371 that are engaged with the pair of sun gears 369 to rotate together are disposed inside the main gear body 363. The pair of planetary gears 371 are disposed to be spaced horizontally apart from each other in the axial direction.

The pair of sun gears 369 are respectively coupled to the main gear body 363 so as to rotate around a rotational shaft disposed along the axial direction.

The pair of planetary gears 371 are respectively coupled to the main gear body 363 so as to rotate around a rotational shaft disposed perpendicular to the axial direction.

A pair of inner shafts 310 are connected to the pair of sun gears 369, respectively.

The pair of inner shafts 310 are spaced apart from each other and are respectively disposed along the axial direction.

An inner shaft 310, which is disposed inside the rotor shaft 271, of the inner shafts 310 is rotatably connected to a sun gear 369, which is disposed close to the motor 210, of the pair of sun gears 369.

Accordingly, rotational force (driving force) of the rotor shaft 271 can be transmitted to the inner shaft 310 when the rotor rotates.

The pair of inner shafts 310 may be connected to driving wheels of the vehicle. Accordingly, rotational force (driving force) of the motor 210 can be transmitted to each driving wheel of the vehicle.

A gear shaft 355 is disposed on one side of the main gear 361.

The gear shaft 355 is disposed in parallel to the axial direction.

The gear shaft 355 is coupled to the counter gear 353 and the power transmission gear 359.

Gear shaft bearings 357 are disposed on both end portions of the gear shaft 355. Accordingly, the gear shaft 355 may be rotatably supported. The gear shaft bearing 357 may be implemented, for example, as a ball bearing.

An accommodation space in which the main gear 361 is accommodated is formed inside the gear housing 150.

The gear housing 150 may be implemented, for example, in a cylindrical shape with a side toward the motor 210 open along the axial direction.

The main gear bearing 365 and a portion of the main gear body 363 are accommodated inside the gear housing 150.

The gear housing 150 includes a main gear bearing accommodating part 160 in which the main gear bearing 365 can be accommodated.

A penetration portion 162 is formed through the main gear bearing accommodating part 160 in the axial direction.

The inner shaft 310 described above (a second inner shaft 3102, which will be described later) may be coupled to be accommodated inside the penetration portion 162.

The sealant 166 that blocks a gap between the inner shaft 310 and the penetration portion 162 may be disposed on the penetration portion 162.

Here, an inner shaft 310, which is disposed inside the rotor shaft 271, of the inner shafts 310 may be referred to as a first inner shaft 311, and an inner shaft 310 drawn out through the penetration portion 162 may be referred to as a second inner shaft 312.

On the other hand, a gear shaft bearing accommodating part 170 for accommodating the gear shaft bearing 357 is formed in the gear housing 150. The gear shaft bearing accommodating part 170 may be disposed on one side of the main gear bearing accommodating part 160 at a spacing therebetween along a radial direction.

Meanwhile, the oil storage part 400 includes a gear-side oil storage part 410 disposed inside the gear housing 150.

Accordingly, some of the oil 105, which moves (scatters) upward in the housing 100 when the gear train 350 rotates, can be accommodated inside the gear-side oil storage part 410.

With this configuration, the level (the height of the oil level) of the oil 105 inside the housing 100 can be lowered, and thus, rotational resistance due to contact with the oil 105 during the rotation of the gear train 350 can be reduced.

The gear-side oil storage part 410 may be formed along a circumference of the main gear bearing accommodating part 160.

The gear-side oil storage part 410 may be implemented in an arc shape with one side open along the axial direction.

The gear-side oil storage part 410 may be implemented, for example, in a "C" shape.

In this embodiment, a lower portion of the gear-side oil storage part 410 may be disposed in a lower portion of the gear housing 150, an upper portion of the gear-side oil storage part 410 may be disposed in an upper portion of the gear housing 150, and thus the gear-side oil storage part 410 may be configured by connecting the lower portion and the upper portion in the "C" shape.

The gear-side oil storage part 410 includes, for example, an oil storage space 411 formed around the main gear bearing accommodating part 160, and an oil cover 412 coupled to block an opening of the oil accommodation space 411.

Figure 4:
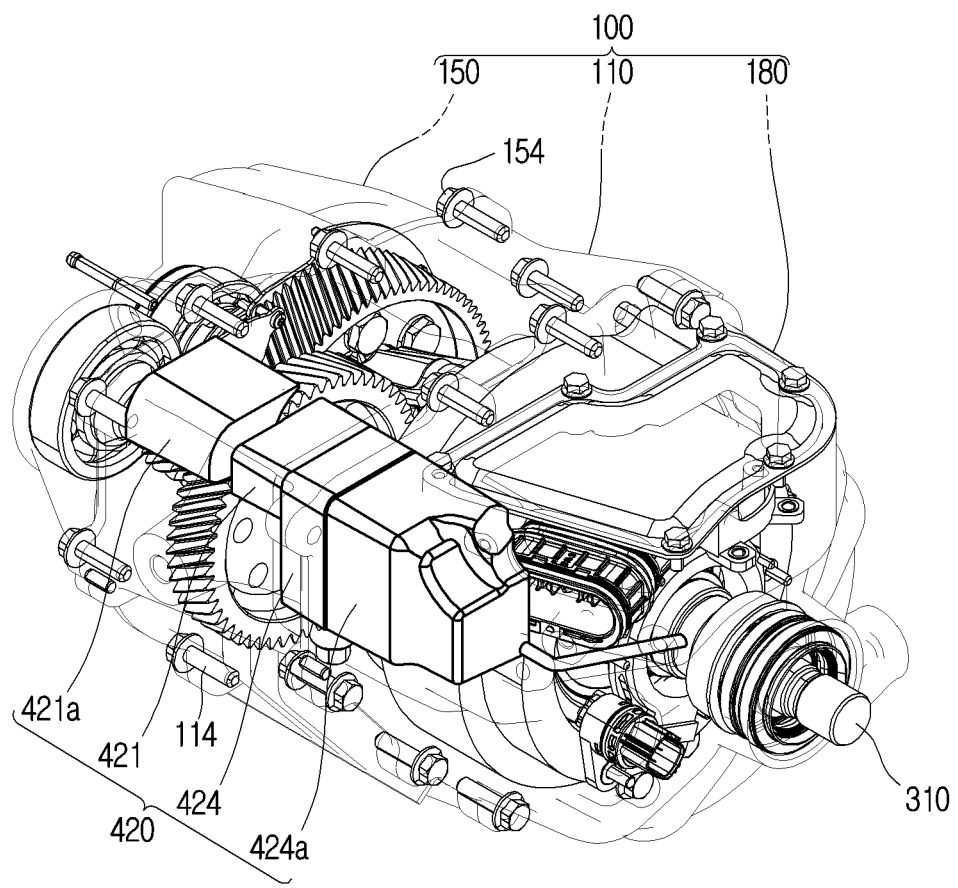
FIG. 4 is a view illustrating an inside of the motor assembly of FIG. 1.

FIG. 4 is a view illustrating an inside of the motor assembly of FIG. 1. As illustrated in FIG. 4, the oil storage part 400 is disposed inside the housing 100.

The oil storage part 400 includes the gear-side oil storage part 410 disposed inside the gear housing 150.

The oil storage part 400 includes a motor-side oil storage part 420 disposed inside the main housing 110.

In this embodiment, the gear-side oil storage part 410 is formed close to the main gear 361, and the motor-side oil storage part 420 is formed close to the counter gear 353.

The gear-side oil storage part 410 may be configured such that the oil 105 scattered mainly by the main gear 361 flows and is stored therein during the rotation of the gear train 350.

The motor-side oil storage part 420 may be configured such that the oil 105 scattered mainly by the counter gear 353 flows and is stored therein during the rotation of the gear train 350.

For example, the motor-side oil storage part 420 may extend from one side of the counter gear 353 in the axial direction, and may extend to the cover housing 180 via an area spaced radially outward of the stator 220.

An oil supply passage 426 for supplying the oil 105 toward the rotor shaft bearing 290 is disposed on one side of the motor-side oil storage part 420.

Figure 5:
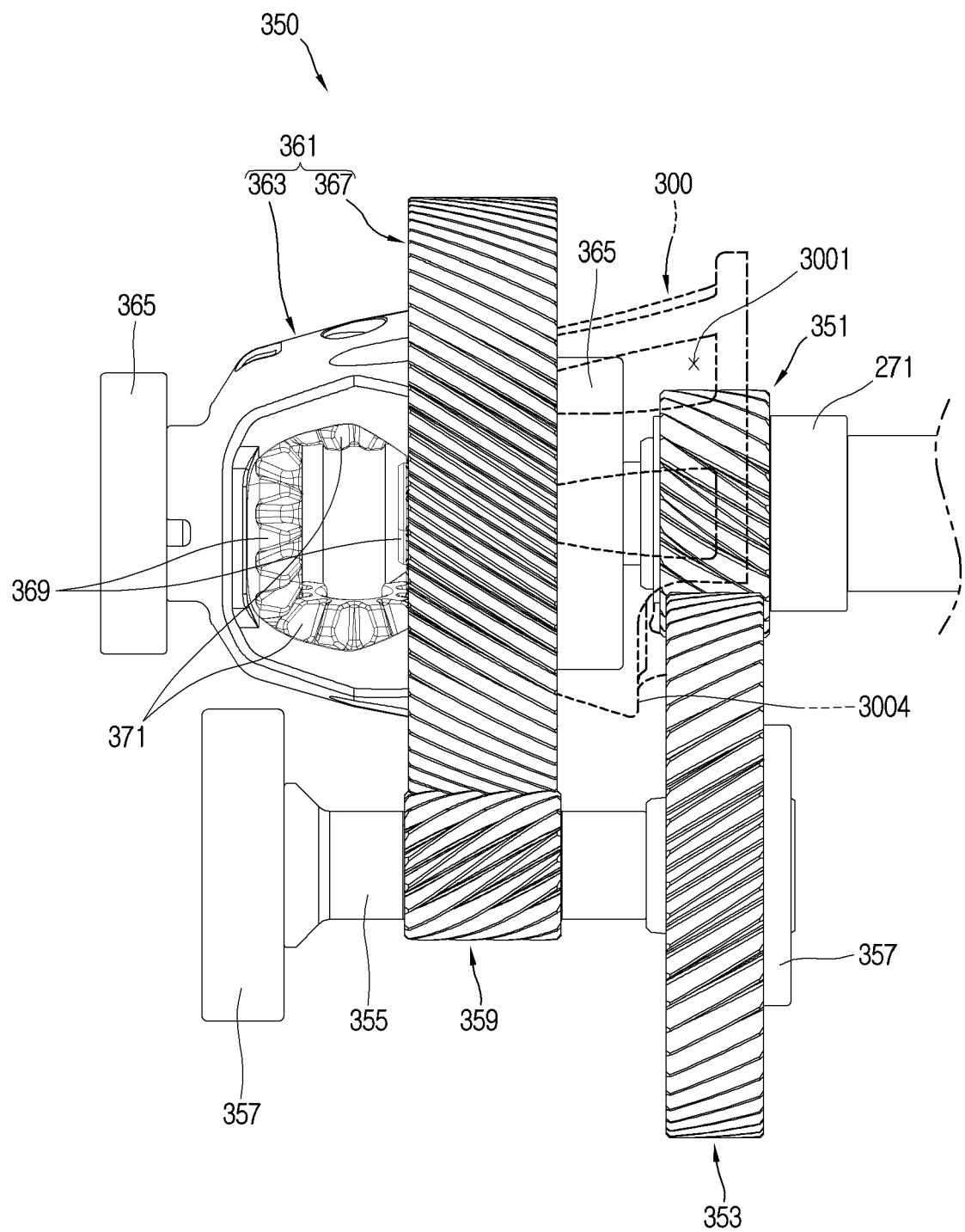
FIG. 5 is a planar view of a gear train of FIG. 4.

FIG. 5 is a planar view of the gear train of FIG. 4. As illustrated in FIG. 5, the driving gear 351 is disposed on one end portion (left end portion) of the rotor shaft 271. The counter gear 353 is engaged with the driving gear 351 to be rotatable together. The gear shaft 355 is coupled to the center of the counter gear 353. The gear shaft 355 is disposed parallel to the rotor shaft 271. Gear shaft bearings 357 are disposed on both end portions of the gear shaft 355.

The power transmission gear 359 is coupled to the gear shaft 355. The main gear 361 is engaged with the power transmission gear 359.

The main gear 361 includes the main gear body 363 and a ring gear 367 rotatably coupled to the main gear body 363. The main gear body 363 is disposed axially on one side (a left side in the drawing) of the rotor shaft 271 along the axial direction.

The pair of sun gears 369 that are spaced apart from each other in the axial direction are disposed inside the main gear body 363. The pair of planetary gears 371 are disposed inside the main gear body 363 and rotatably engaged with the pair of sun gears 369 along a direction perpendicular to the axial direction.

Main gear bearings 365 are disposed on both end portions of the main gear body 363 along the axial direction.

The main gear bearing 365 on a left side, of the main gear bearings 365, as aforementioned, is accommodated inside the main gear bearing accommodating part 160 of the gear housing 150.

The main gear bearing 365 on a right side, of the main gear bearings is supported by a bracket 300.

As illustrated in FIG. 2, the bracket 300 is coupled to the inner wall 120 of the main housing 110.

A driving gear accommodating part 3001 in which the driving gear 351 is accommodated is formed on one side (right side in the drawing) inside the bracket 300.

A main gear bearing accommodating part 3002 in which the main gear bearing 365 is accommodated is formed on another side (a left side in the drawing) inside the bracket 300.

An inner shaft accommodation hole 3003 is formed through the inner center of the bracket 300 along the axial direction to accommodate the inner shaft 310.

A counter gear insertion hole 3004 is disposed on one side along the circumferential direction of the driving gear accommodating part 3001, and is formed in a cutting manner such that the counter gear 353 can be partially inserted.

Figure 6:
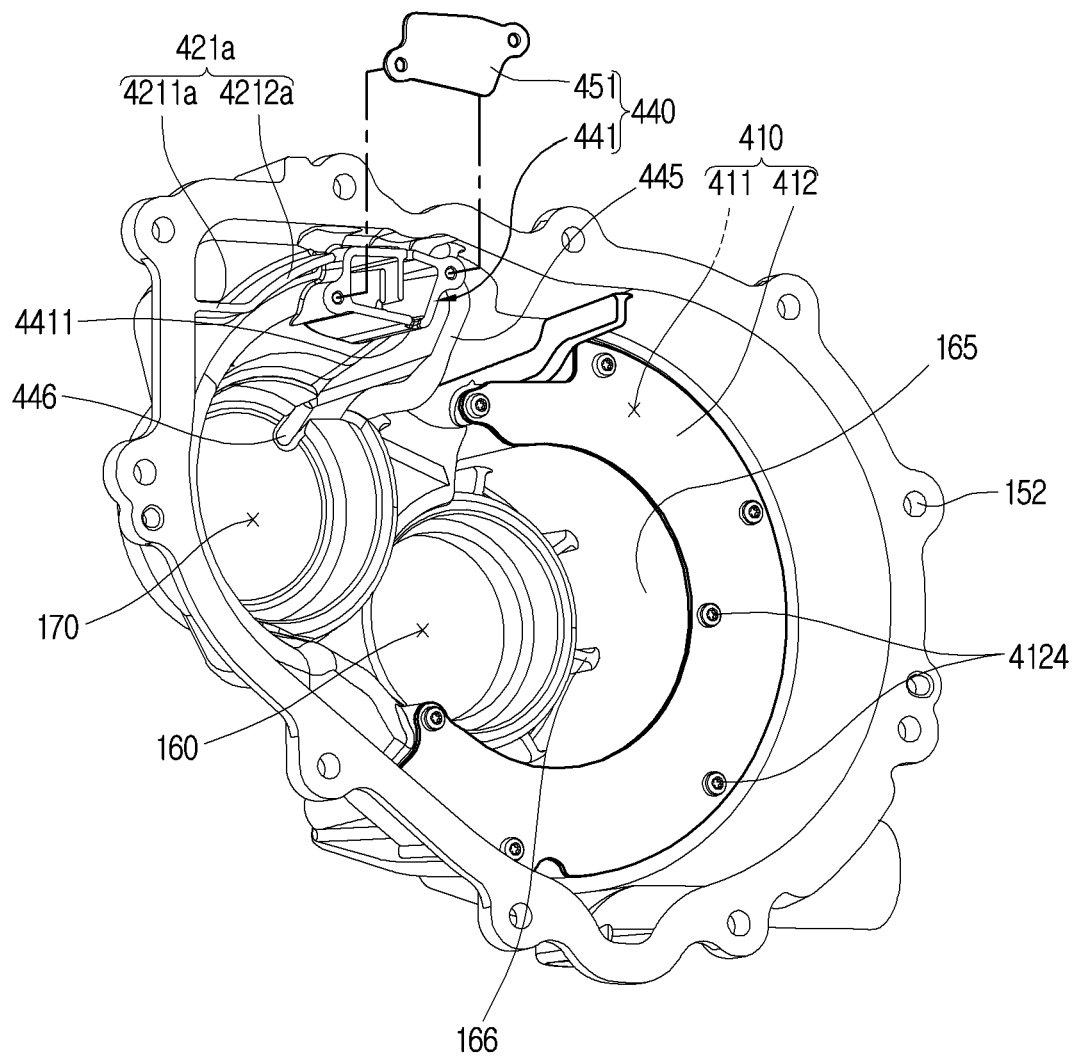
FIG. 6 is a view illustrating an inside of a gear housing of FIG. 1.
Figure 7:
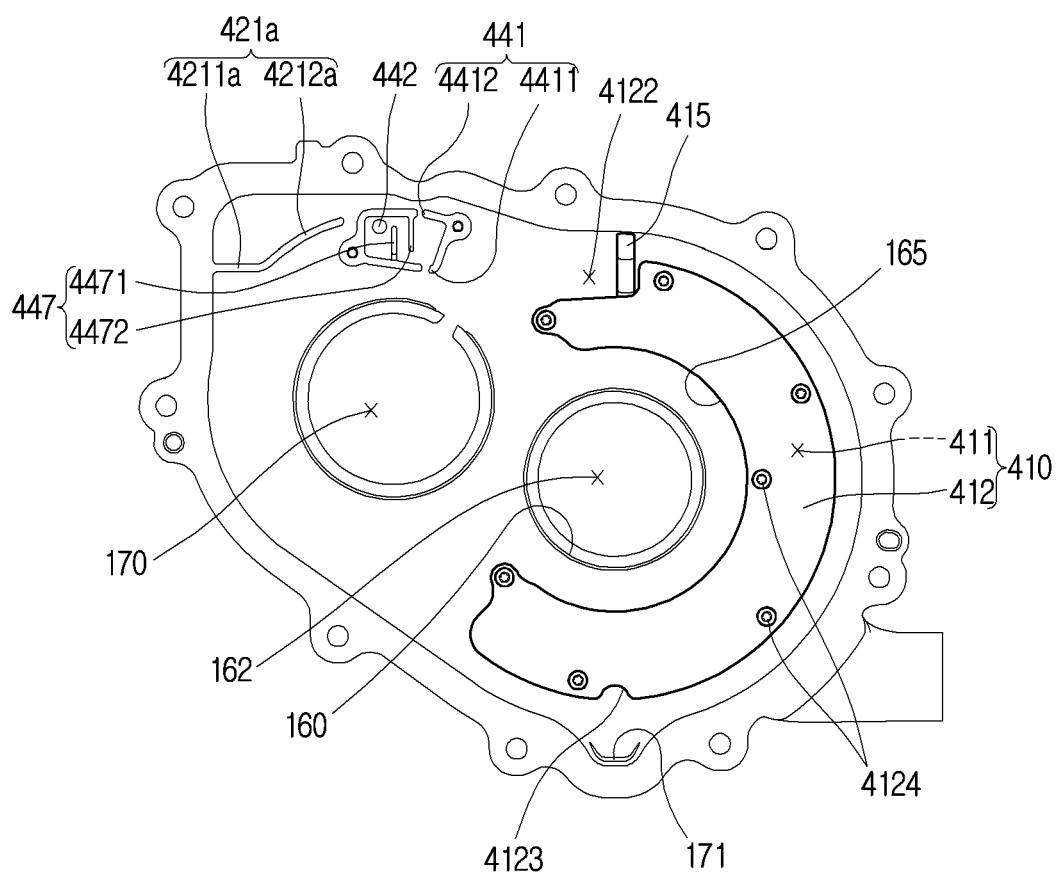
FIG. 7 is a front view of the gearing housing of FIG. 6.
Figure 8:
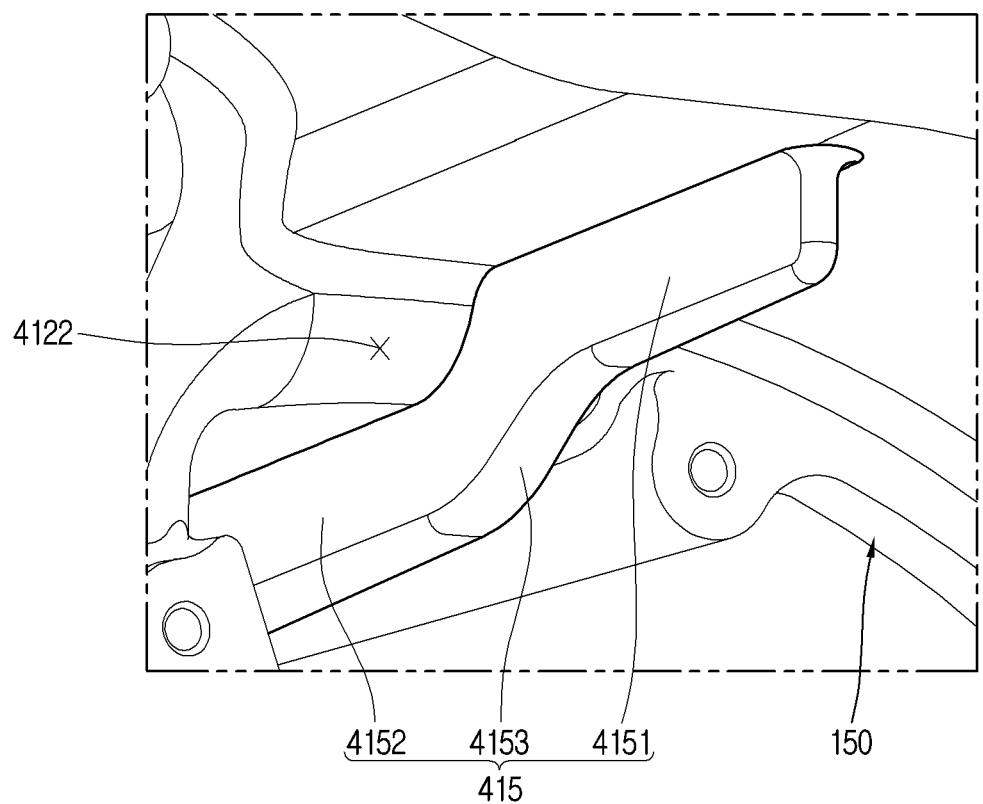
FIG. 8 is an enlarged view of a guide rib area of FIG. 6.
Figure 9:
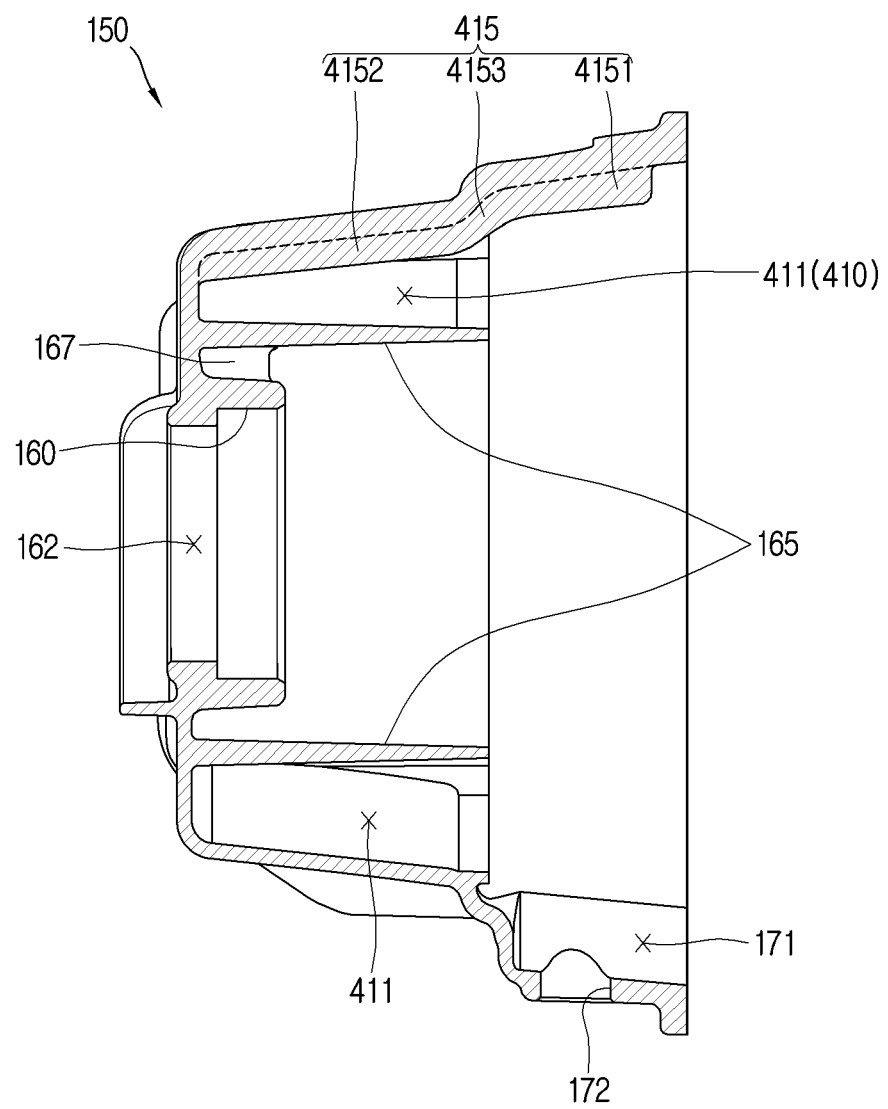
FIG. 9 is a cross-sectional view of the gear housing of FIG. 6.
Figure 10:
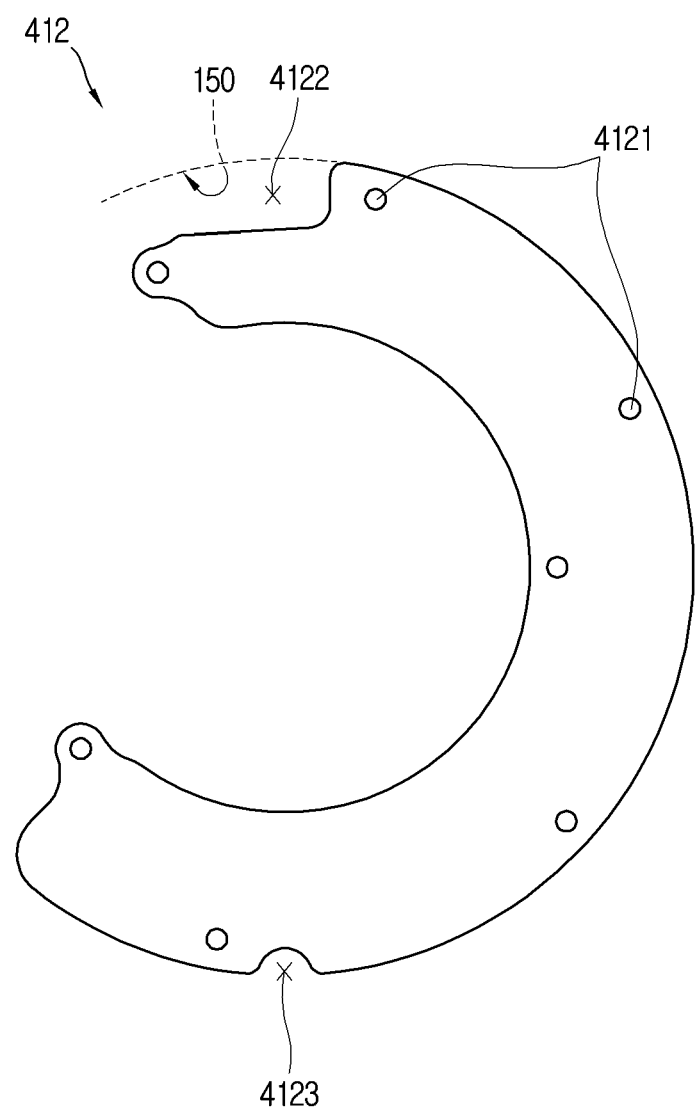
FIG. 10 is a front view of an oil cover of FIG. 6.

FIG. 6 is a view illustrating an inside of the gear housing of FIG. 1, FIG. 7 is a front view of the gearing housing of FIG. 6, FIG. 8 is an enlarged view of a guide rib area of FIG. 6, FIG. 9 is a cross-sectional view of the gear housing of FIG. 6, and FIG. 10 is a front view of the oil cover of FIG. 6. As illustrated in FIGS. 6 and 7, an accommodation space is formed inside the gear housing 150 to accommodate the gear train 350.

The gear housing 150, for example, may be formed in an elliptical cross-sectional shape.

The gear housing 150 is formed so that an end portion coupled to the main housing 110 along the axial direction has a larger size than another end portion.

The gear housing 150 is formed in a shape whose size gradually decreases away from an end portion facing the main housing 110 along the axial direction.

The inside of the gear housing 150 is configured such that an inner width of a space where the ring gear 367 of the main gear 361 is disposed is the greatest and gradually decreases away from the main housing 110 along the axial direction.

The main gear bearing accommodating part 160 in which the main gear bearing 365 is accommodated is formed inside the gear housing 150.

Specifically, the main gear bearing accommodating part 160 has a substantially cylindrical shape, and an intermediate wall 165 is formed on the outside of the main gear bearing accommodating part 160. The intermediate wall 165 is configured to have a "C" shape, for example. The intermediate wall 165 may be formed to be concentric with the main gear bearing accommodating part 160, for example. The intermediate wall 165 is formed to be spaced inwardly apart from an outer wall of the gear housing 150 along the radial direction. A plurality of support ribs 167 are disposed between the main gear bearing accommodating part 160 and the intermediate wall 165. Accordingly, the main gear bearing accommodating part 160 may be stably supported.

The gear-side oil storage part 410 is formed radially outside the main gear bearing accommodating part 160. The gear-side oil storage part 410 is formed (in a space) between the intermediate wall 165 and the outer wall of the gear housing 150.

Specifically, the gear-side oil storage part 410 includes, for example, the oil accommodation space 411 formed between the intermediate wall 165 and the outer wall of the gear housing 150, and the oil cover 412 coupled to block the opening of the oil accommodation space 411.

Here, the gear-side oil storage part 410 may be configured, for example, such that an angle between lines which connect both end portions of the gear-side oil storage part 410 in the circumferential direction and the center of the main gear bearing accommodating part 160 is equal to or greater than a straight angle (180 degrees) and less than 360 degrees.

The oil cover 412, as illustrated in FIG. 10, may be implemented as a plate having a "C" shape to correspond to the shape of the oil storage space 411, for example.

The oil cover 412 may include an oil outlet 4123 through which the oil 105 inside the oil accommodation space 411 can flow out. The oil outlet 4123 may be formed by, for example, cutting a lower portion of the oil cover 412 into an arcuate shape. The oil outlet 4123 may be formed at a position corresponding to the lowest point of the oil storage space 411.

An oil inlet 4122 through which the oil 105 flows in is formed in the oil cover 412. The oil inlet 4122 may be formed, for example, by cutting the top of the oil cover 412. The oil inlet 4122 may be formed, for example, by cutting the top of the oil cover 412 into a substantially rectangular shape that is long in the left and right directions. Here, a flow area of the oil inlet 4122 is formed to be larger than a flow area of the oil outlet port 4123.

With this configuration, when the oil 105 is scattered by the gear train 350 during the rotation of the gear train 350, an amount of the oil 105 flowing into the oil storage space 411 through the oil inlet 4122 can be greater than an amount of the oil 105 discharged through the oil outlet 4123, such that a considerable amount of the oil 105 can always be stored (accommodated) inside the oil storage space 411.

A plurality of fastening member coupling portions 4121 are formed through the oil cover 412, so that the oil cover 412 can be coupled to an edge of the oil storage space 411 by a plurality of fastening members 4124.

The recess portion 171 may be formed below the gear-side oil storage part 410. The recess portion 171 is formed to extend toward the motor 210 along the axial direction. The outlet 172 is disposed in the recess portion 172.

A lower end portion of both end portions of the gear-side oil storage part 410 is located at a position spaced apart from the recess portion 171 along the circumferential direction.

The oil outlet 4123 is formed above the recess portion 171 along the vertical direction of the gear housing 150.

An upper end portion of the both end portions of the gear-side oil storage part 410 is disposed at a spacing above the lower end portion. The oil inlet 4122 is disposed on the upper end portion of the gear-side oil storage part 410, so that some of the oil 105 scattered upward during the rotation of the gear train 350 can be introduced.

The gear shaft bearing accommodating part 170 is formed on one side (an upper left portion in the drawing) of the main gear bearing accommodating part 160.

The gear shaft bearing accommodating part 170, for example, may be formed in a cylindrical shape.

Meanwhile, the housing 100 may include therein an oil supply part 440 that supplies the oil 105.

The oil supply part 440 may be disposed above the gear shaft bearing accommodating part 170, for example.

For example, a guide part 445 is disposed below the oil supply part 440, for example, to guide the oil 105 dropped from the oil supply part 440 toward the gear shaft bearing accommodating part 170.

An oil groove 446 may be disposed on one side of the guide part 445 to guide the oil 105 to flow into the gear shaft bearing accommodating part 170.

The oil supply part 440 includes, for example, an oil accommodation space 441 formed above the gear shaft bearing accommodating part 170 and having a side facing the motor 210 in the axial direction open, and a cover 451 coupled to block the opening of the oil accommodation space 441.

An oil supply hole 442 is formed through the outer wall of the oil accommodation space 441 so that the oil 105 can be supplied. An oil supply pipe 443 may be disposed outside the gear housing 150 and connected to the oil supply hole 442.

An oil outlet 4411 through which the oil 105 flows out is formed through a bottom surface portion of the oil accommodation space 441.

A plurality of ribs 447 are disposed inside the oil accommodation space 441 and extend in the vertical direction.

The plurality of ribs 447 include a lower rib 4471 extending upward from the bottom surface portion of the oil accommodation space 441, and an upper rib 4472 extending downward from an upper surface portion of the oil accommodation space 441.

The upper surface portion of the oil accommodation space 441 is formed to be spaced a certain distance apart from an upper surface portion of the gear housing 150.

A through hole 4412 is formed through the upper surface portion of the oil accommodation space 441.

As a result, the oil 105 in the upper surface portion of the oil accommodation space 441 may flow into the oil accommodation space 441 through the through hole 4412.

Additionally, the oil 105 in the oil accommodation space 441 may flow out of the oil accommodation space 441 through the through hole 4412.

An oil collecting portion 421 of the motor-side oil storage part 420 to be explained later is formed on one side (a left side in the drawing) of the oil supply part 440.

A guide rib 415 is disposed in an upper area of the gear-side oil storage part 410.

The guide rib 415 may be formed, for example, on a vertical center line that passes through the center of the main gear 361.

The guide rib 415 protrudes along the radial direction from an inner surface of the upper surface portion of the gear housing 150.

For example, the guide rib 415 may be configured such that one end portion is disposed above the main gear 361 and another end portion is disposed inside the gear-side oil storage part 410.

As a result, when the gear train 350 rotates, some of the oil 105 scattered by the gear train 350 can move into the gear-side oil storage part 410 by the guide rib 415.

As illustrated in FIGS. 8 and 9, the guide rib 415 protrudes downward from the inner surface of the upper surface portion of the gear housing 150 and extends along the axial direction.

The guide rib 415 includes, for example, a first section 4151 disposed above the gear train 350 along the axial direction, a second section 4152 disposed in the oil accommodation space along the axial direction, and a connection section 4153 connecting the first section 4151 and the second section 4152.

Here, since the first section 4151 is disposed above the main gear 361 and the second section 4152 is disposed in an upper side of the gear-side oil storage part 410 (oil accommodation space), the first section 4151 is located at a higher position than the second section 4152.

As a result, the connection section 4153 is formed to be inclined with respect to the radial direction of the main gear bearing accommodating part 160.

With this configuration, oil scattered during the rotation of the gear train 350 adheres on the first section 4151, and the adhered oil moves downward under the action of gravity. At this time, the oil in the first section 4151 may move toward the second section 4152 along an inclined surface of the connection section 4153 due to the viscosity of the oil and the action of gravity.

The oil moved to the second section 4152 may fall into the gear-side oil storage part 410 under the action of gravity and be stored inside the oil accommodation space 411. The oil inside the gear-side oil storage part 410 may flow out to the bottom inside the housing 100 (the gear housing 150) through the oil outlet 4123.

Figure 11:
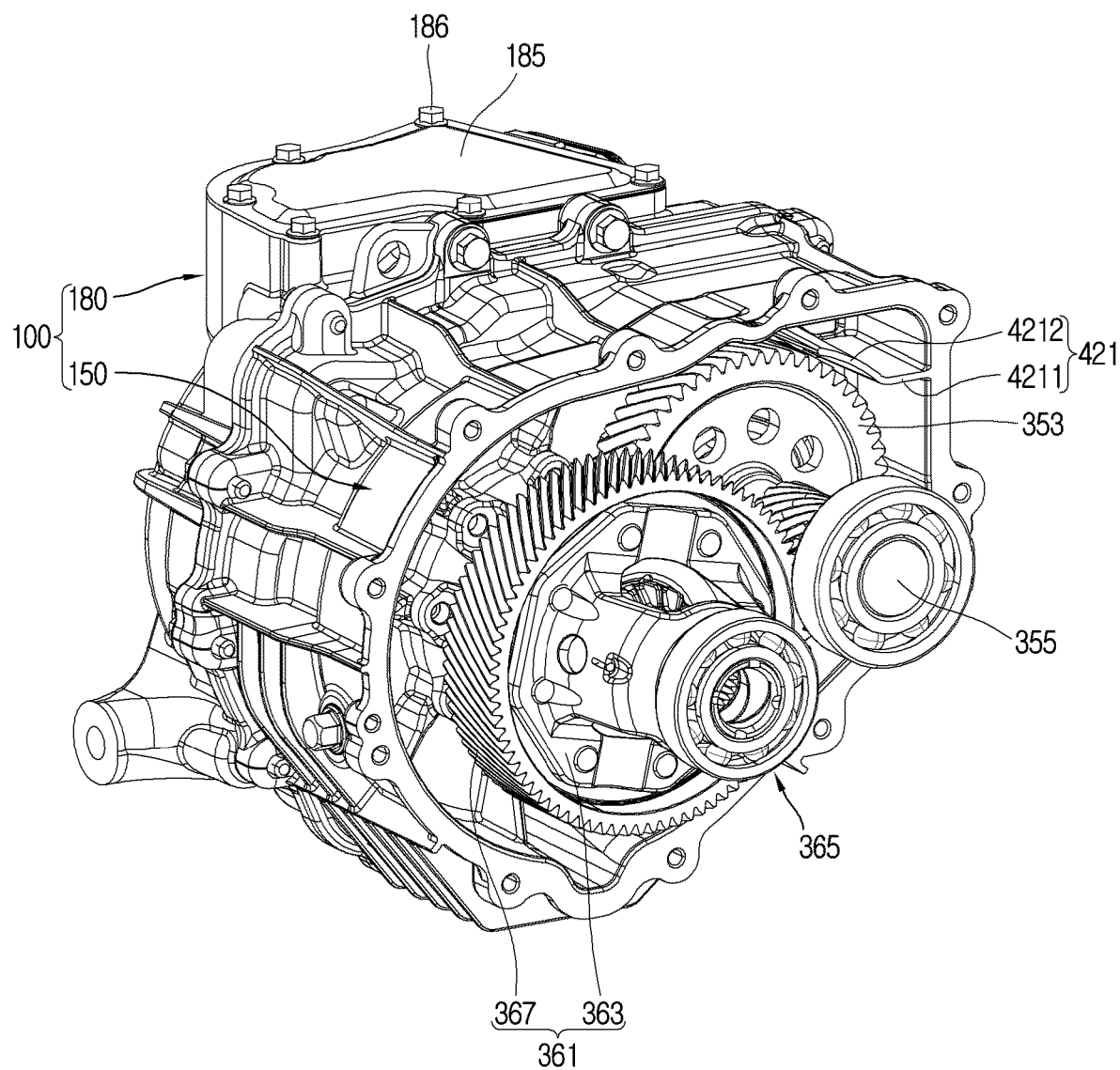
FIG. 11 is a view illustrating the inside of the gear housing of the motor assembly of FIG. 1.
Figure 12:
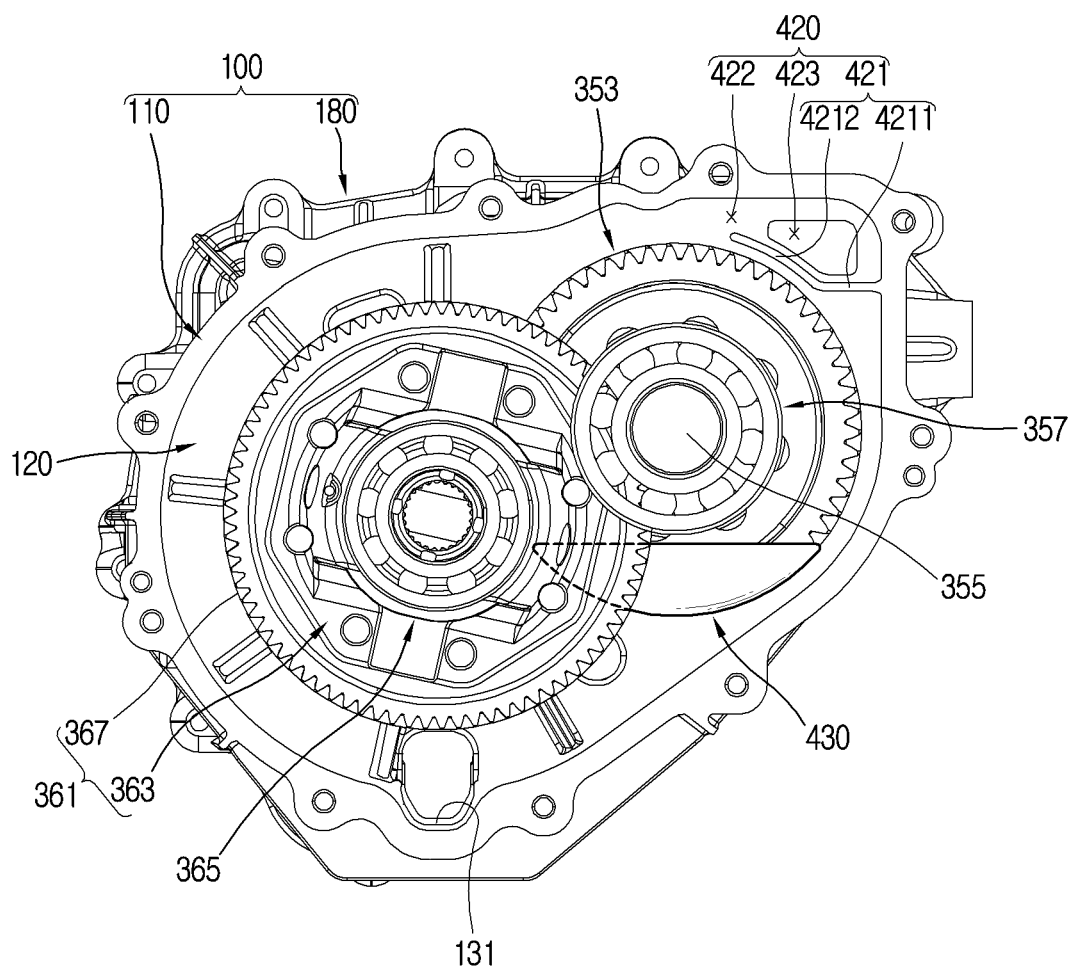
FIG. 12 is a front view of FIG. 11.
Figure 13:
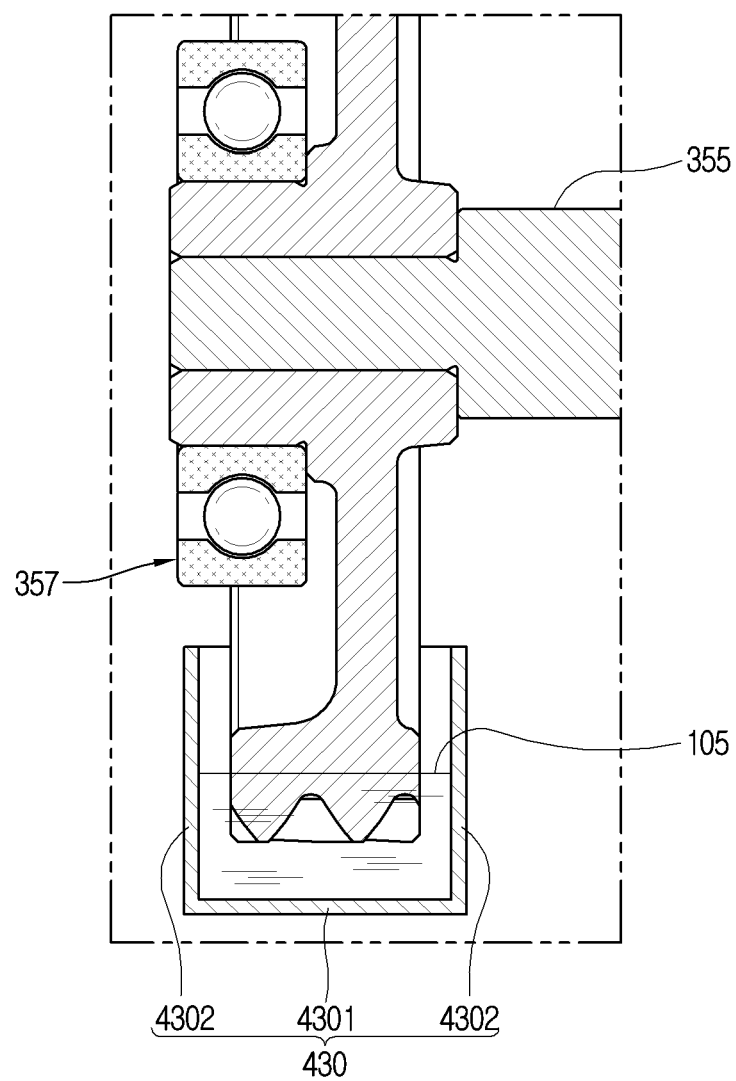
FIG. 13 is a cross-sectional view of a counter gear oil storage portion of FIG. 12.
Figure 14:
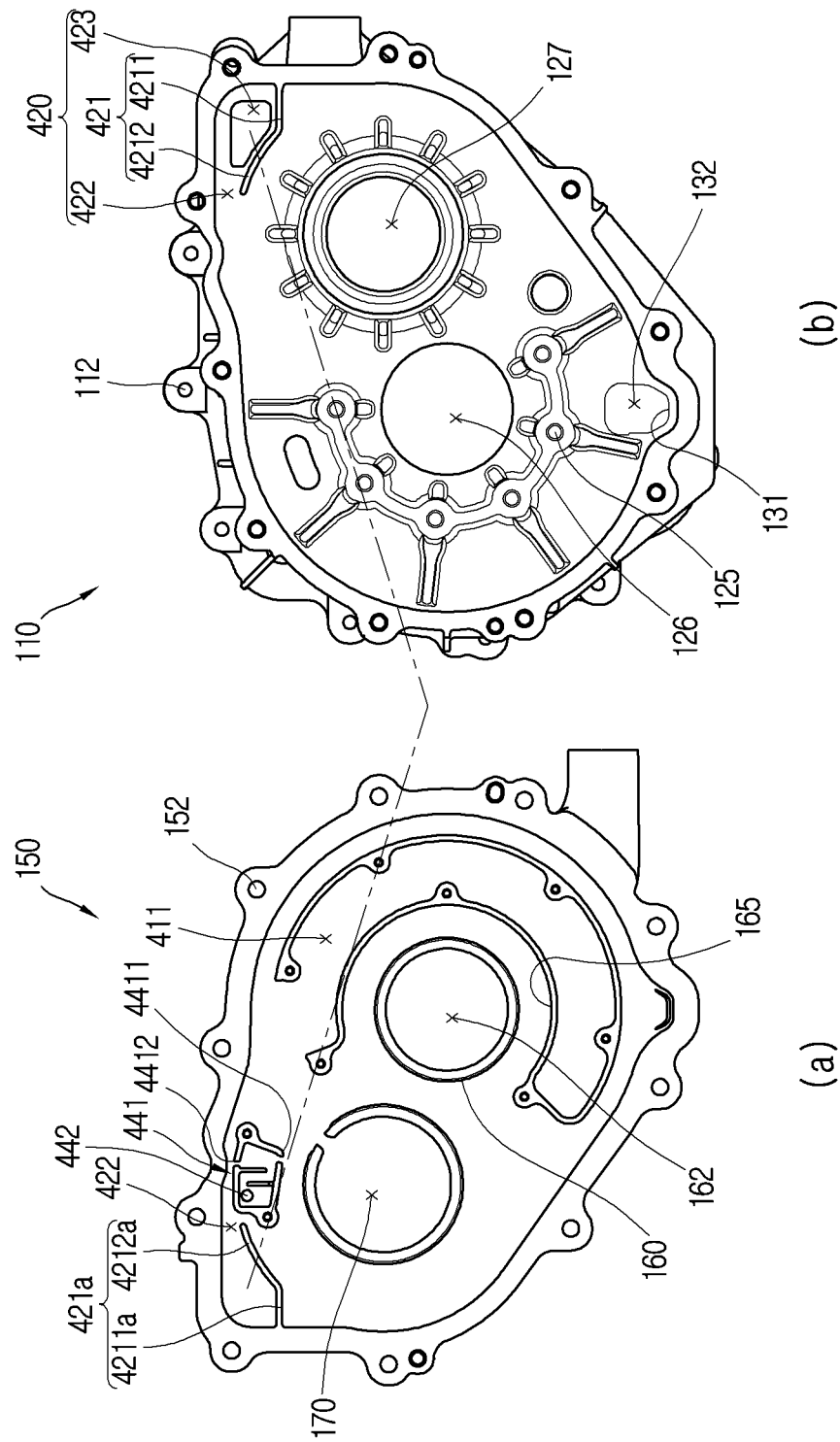
FIG. 14 is a view for explaining coupling relationship between the gear housing and a main housing of FIG. 1.
Figure 15:
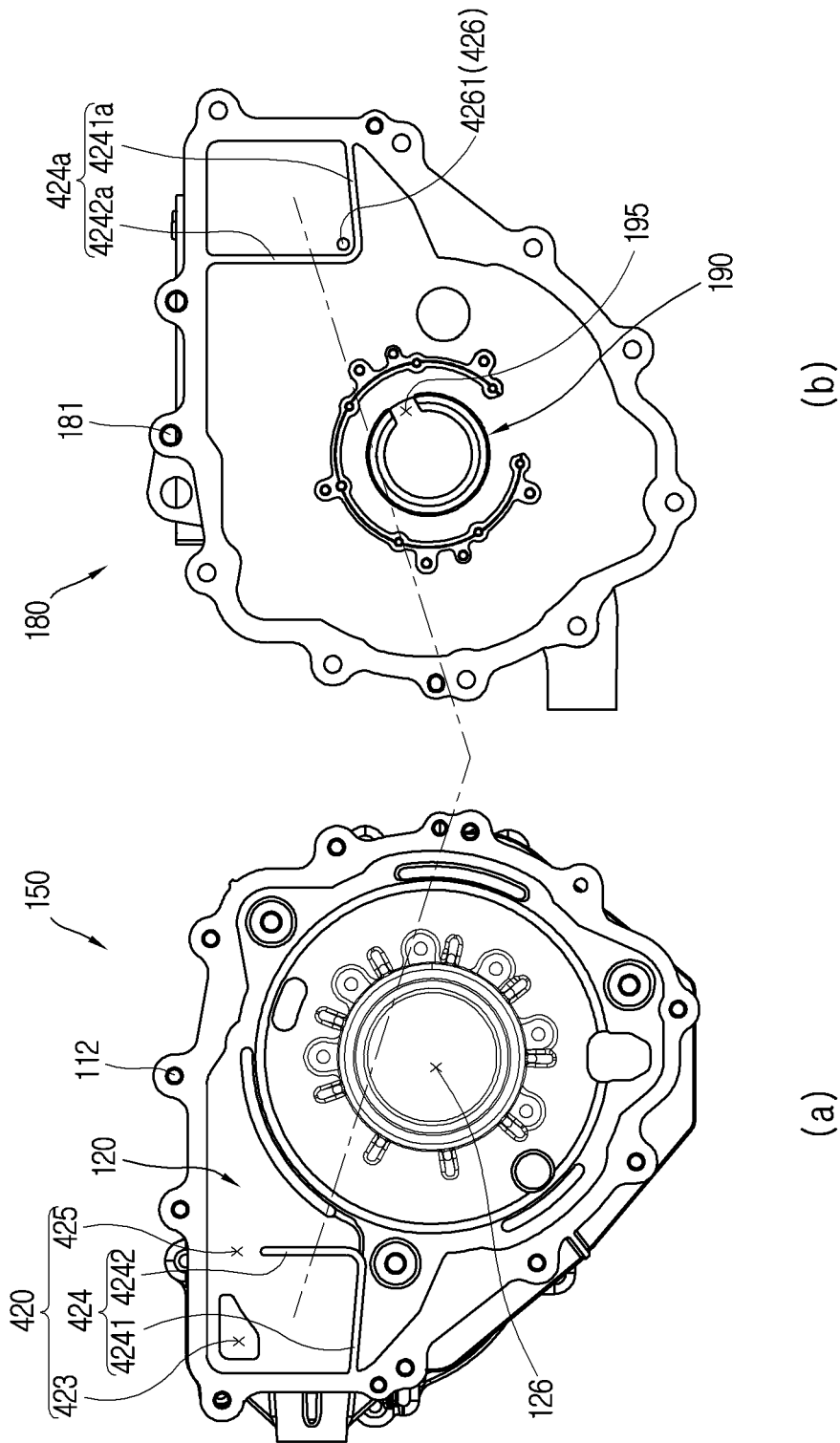
FIG. 15 is a view for explaining coupling relationship between the main housing and a cover housing of FIG. 1.
Figure 16:
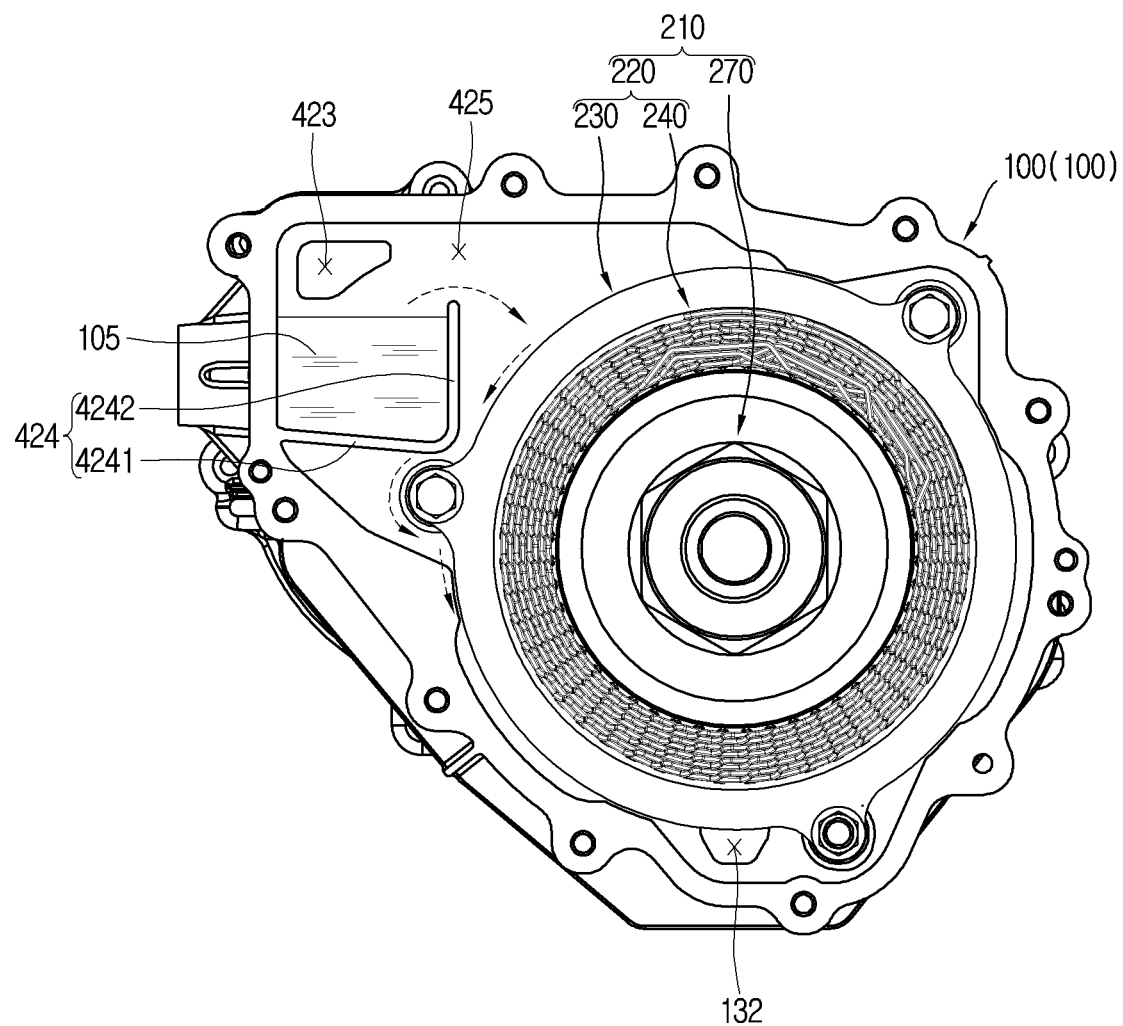
FIG. 16 is a view illustrating an inside of the main housing of FIG. 2.

FIG. 11 is a view illustrating the inside of the gear housing of the motor assembly of FIG. 1, FIG. 12 is a front view of FIG. 11, FIG. 13 is a cross-sectional view of a counter gear oil storage portion of FIG. 12, FIG. 14 is a view for explaining coupling relationship between the gear housing and the main housing of FIG. 1, FIG. 15 is a view for explaining coupling relationship between the main housing and the cover housing of FIG. 1, and FIG. 16 is a view illustrating an inside of the main housing of FIG. 2. As illustrated in FIGS. 11 and 12, the cover housing 180 is coupled to one side of the main housing 110.

The inner wall 120 is disposed inside the main housing 110, and the gear accommodating part to accommodate a portion of the gear train 350 is formed on one side of the inner wall 120 (a side toward the gear housing 150). The motor accommodating part to accommodate the motor 210 is formed on another side of the inner wall 120 (a side toward the cover housing 180).

The recess portion 131 that is recessed downward is disposed in the bottom of the main housing 110. The recess portion 131 of the main housing 110 may be formed to communicate with the recess portion 171 of the gear housing 150. With this configuration, the oil 105 inside the housing 100 can be collected inside the recess portion 171.

Meanwhile, as illustrated in FIG. 12, the oil storage part 400 includes a counter gear oil storage portion 430 that is disposed below the counter gear 353 and accommodates oil therein.

The counter gear oil storage portion 430 may have a substantially arcuate shape.

The counter gear oil storage portion 430 is configured to be open upward so that the counter gear 353 can be inserted and rotated therein.

As illustrated in FIG. 13, the counter gear oil storage portion 430 includes a bottom surface portion 4301 formed in an arcuate shape and disposed to be spaced apart from an outer periphery of the counter gear 353, and both side wall portions 4302 extending radially from both sides of the bottom surface portion 4301 and forming an oil accommodation space therein.

The bottom surface portion 4301 is formed to be radially spaced a preset distance apart from the outer periphery of the counter gear 353.

The both side wall portions 4302 are disposed to be axially spaced preset distances apart from both side surfaces of the counter gear 353, respectively.

With this configuration, some of the oil scattered upward by the gear train 350 during the rotation of the gear train 350 can be accommodated inside the counter gear oil storage portion 430 and may be scattered again by being in contact with the bottom of the counter gear 353.

This can facilitate cooling and lubrication of the counter gear 353 and the driving gear 351, respectively.

Meanwhile, the oil storage part 400 includes the motor-side oil storage part 420 disposed at an upper portion inside the main housing 110.

Referring to FIG. 4 together, the motor-side oil storage part 420 includes, for example, a through hole 423 formed through the inner wall 120, an oil collecting portion 421 disposed below the through hole 423 inside the gear accommodating part to collect the oil 105 and making the collected oil discharged through the through hole 423, and an oil accommodating portion 424 disposed inside the motor accommodating part 105 and accommodating the oil 105 discharged through the through hole 423.

The counter gear 353 is disposed inside the main housing 110, and the oil collecting portion 421 is formed above the counter gear 353 inside the main housing 110.

The oil collecting portion 421 may include, for example, a bottom surface portion 4211 extending horizontally inward from the outer wall of the main housing 110, and an extension portion 4212 upwardly extending from the bottom surface portion 4211 toward an upper surface portion to correspond to a circumference (outer circumferential shape) of the counter gear 353.

Here, the extension portion 4212 is formed to be spaced apart from the upper surface portion of the main housing 110.

Accordingly, an oil inlet 422 is formed between an upper end portion of the extension portion 4212 and the upper surface portion of the main housing 110. The oil inlet 422 is open toward the counter gear 353.

The oil collecting portion 421 may extend to an upper portion inside the gear housing 150. As illustrated in FIGS. 6, 7, and 14, the oil collecting portion 421 formed inside the gear housing 150 has a shape corresponding to the oil collecting portion 421 formed inside the main housing 110.

The oil collecting portion 421a of the gear housing 150 includes a bottom surface portion 4211a protruding inward from the outer wall of the gear housing 150, and an extension portion 4212a extending upward from the bottom surface portion 4211a toward the upper surface portion of the gear housing 150.

The oil collecting portion 421a of the gear housing 150 and the oil collecting portion 421 of the main housing 110 are coupled in close contact with each other at each end portion when the gear housing 150 and the main housing 110 are coupled, thereby forming the oil collecting portion 421 cooperatively.

As illustrated in FIG. 14, a gear shaft bearing accommodating part 127 to accommodate the gear shaft bearing 357 is formed in the inner wall 120 of the main housing 110.

A bracket coupling portion 125 to which the bracket 300 is coupled is formed on one side (a left side in the drawing) of the gear shaft bearing accommodating part 127. A penetration portion 126 in which the rotor shaft 271 may be accommodated is formed through the bracket coupling portion 125.

Meanwhile, a through hole 423 of the motor-side oil storage part 420 is formed in an upper area of one side (a right side in the drawing) of the inner wall 120.

The through hole 423 communicates with the oil collecting portion 421.

As a result, oil collected by the oil collecting portion 421 can move toward the motor accommodating part through the through hole 423.

As illustrated in FIG. 15, the oil accommodating portion 424 of the motor-side oil storage part 420 is disposed on one side in the main housing 110.

For example, the oil accommodating portion 424 includes a bottom surface portion 4241 formed above the center of the rotor shaft 271, and a side wall portion 4242 upwardly extending from the bottom surface portion 4241 and spaced apart from an upper surface of the main housing 110 to form the oil outlet 425.

The bottom surface portion 4241 and the side wall portion 4242 may each be disposed at lower positions than the bottom of the through hole 423.

As a result, the oil 105 that has passed through the through hole 423 may fall into the oil accommodating portion 424 and be collected (stored) therein.

As illustrated in FIG. 16, the oil 105 inside the oil accommodating portion 424 may be supplied to the stator 220 (the stator core 230) through the oil outlet 425.

As a result, the stator 220 (the stator core 230) can be cooled.

The oil accommodating portion 424 may extend into the cover housing 180.

An oil accommodating portion 424a inside the cover housing 180 includes, for example, a bottom surface portion 4241a formed at a higher position than the center of the rotor shaft 271, and a side wall portion 4242a upwardly extending from the bottom surface portion 4241a and connected to an upper surface of the cover housing 180.

The gear housing 150 includes a bearing accommodating part 190 in which the rotor shaft bearing 290 and the inner shaft bearing 320 can be accommodated.

The bearing accommodating part 190 includes a through hole formed therethrough such that the inner shaft 310 can be pulled out.

Figure 17:
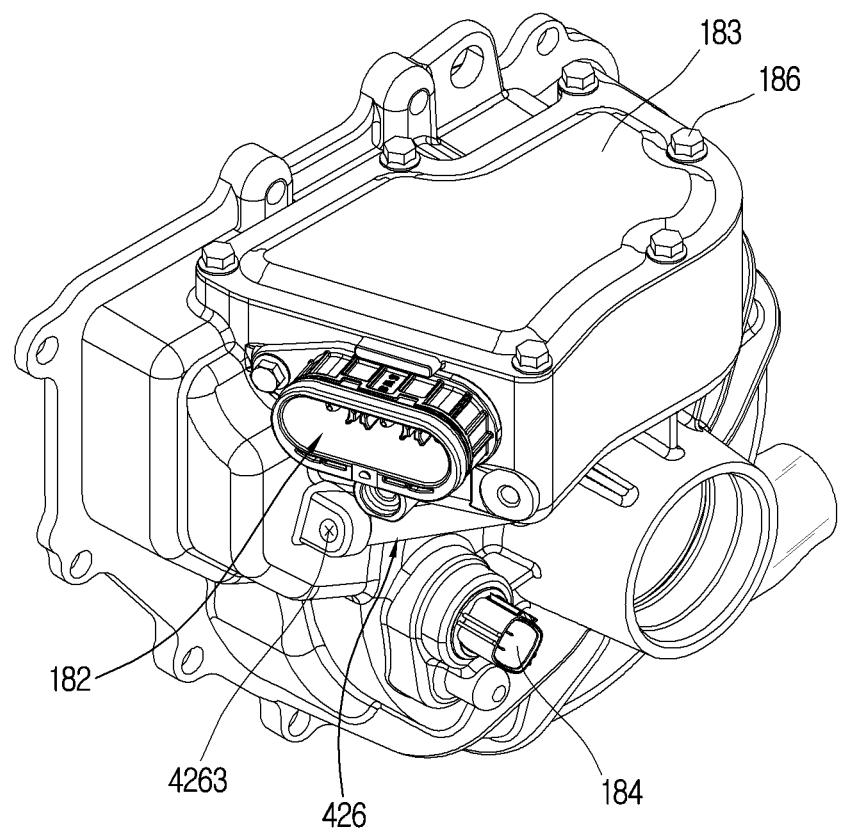
FIG. 17 is a view illustrating an outer area of the cover housing of FIG. 2.
Figure 18:
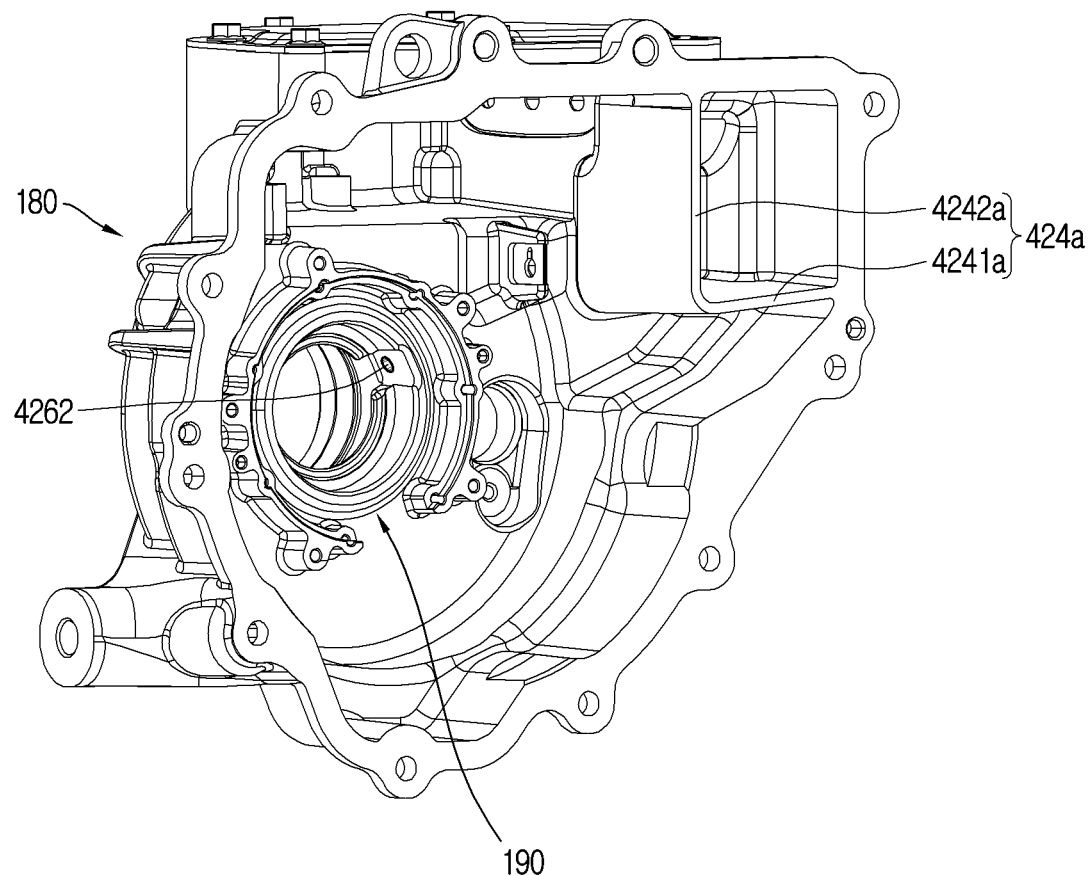
FIG. 18 is a view illustrating the inside of the cover housing of FIG. 17.
Figure 19:
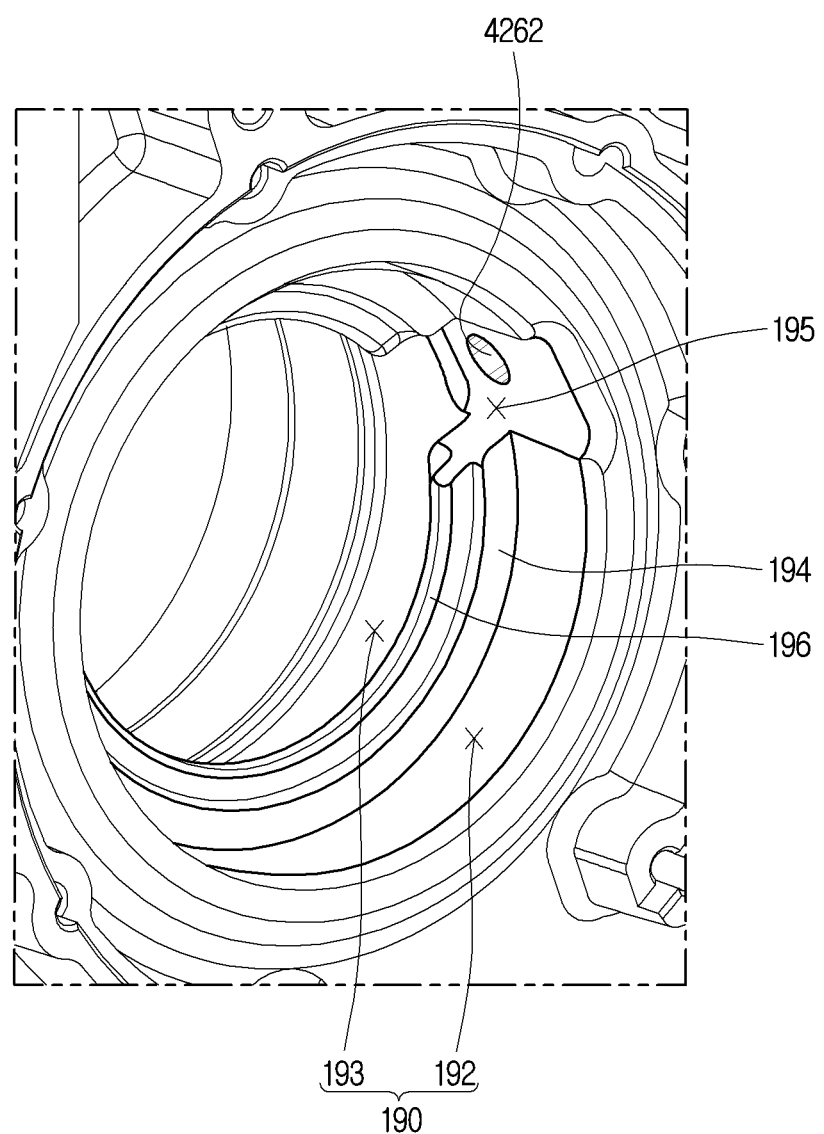
FIG. 19 is an enlarged view illustrating a bearing accommodating part of FIG. 18.
Figure 20:
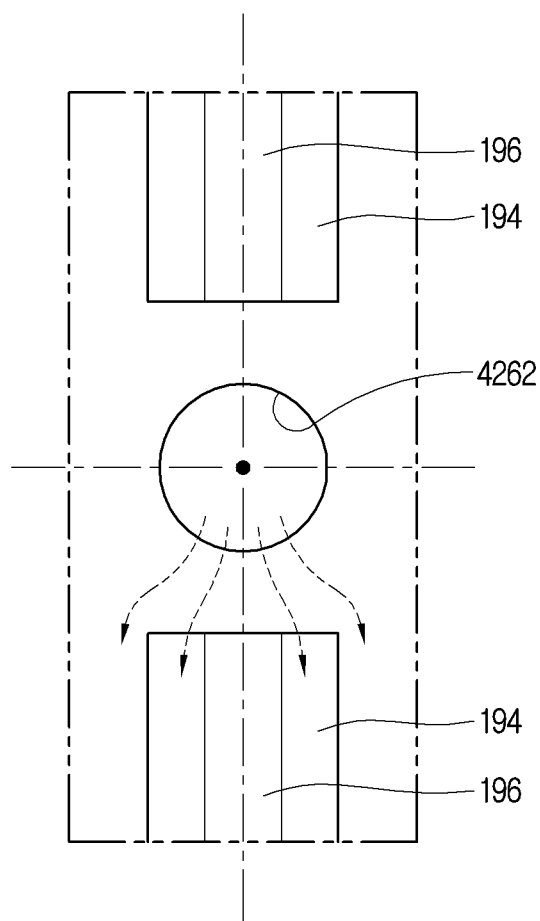
FIG. 20 is a front view of a cutout area of FIG. 19.

FIG. 17 is a view illustrating an outer area of the cover housing of FIG. 2, FIG. 18 is a view illustrating the inside of the cover housing of FIG. 17, FIG. 19 is an enlarged view illustrating a bearing accommodating part of FIG. 18, and FIG. 20 is a front view of a cutout area of FIG. 19. As illustrated in FIGS. 17 and 18, an accommodation space open toward the main housing 110 is formed inside the cover housing 180.

The motor-side oil storage part 420 includes an oil supply passage 426 through which oil is supplied to the rotor shaft bearing 290.

The oil supply passage 426, for example, may be disposed in an outer surface of the cover housing 180, as illustrated in FIG. 16.

One side of the oil supply passage 426 may be connected to communicate with the oil accommodating portion of the motor-side oil storage part 420, and another side may be connected to communicate with the bearing accommodating part 190.

The oil supply passage 426 includes a communication hole 4263 through which outside and the inside thereof communicate with each other.

As a result, oil in the oil accommodating portion 424a can easily move to the bearing accommodating part 190.

The communication hole 4263 may be formed in a penetrating manner at a higher position than the oil supply passage 426, for example.

This can suppress oil inside the oil supply passage 426 from leaking to the outside through the communication hole 4263.

As illustrated in FIG. 15, the oil supply passage 426 has an oil inlet 4261 that communicates with the inside of the oil accommodating portion 424a of the cover housing 180.

As illustrated in FIG. 18, the oil supply passage 426 has an oil outlet 4262 that communicates with the inside of the bearing accommodating part 190 of the cover housing 180.

As illustrated in FIG. 19, the bearing accommodating part 190 of the cover housing 180 includes a rotor shaft bearing accommodating portion 192 in which the rotor shaft bearing 290 is accommodated and an inner shaft bearing accommodating portion 193 in which the inner shaft bearing 320 is accommodated.

The inner shaft bearing accommodating portion 193 is disposed outside the rotor shaft bearing accommodating portion 192 along the axial direction.

A partition portion 194 that protrudes along the radial direction and extends along the circumferential direction is disposed between the rotor shaft bearing accommodating portion 192 and the inner shaft bearing accommodating portion 193.

The partition portion 194 includes a cutout portion 195 from which a partial section is cut out along the circumferential direction.

The oil outlet 4262 of the oil supply passage 426 is formed in the cutout portion 195.

Accordingly, oil discharged through the oil outlet 4262 can move to each of the rotor shaft bearing accommodating portion 192 and the inner shaft bearing accommodating portion 193.

In this embodiment, the oil outlet 4262 may be formed, for example, at a position where its center corresponds to the center of the partition portion 194 along the axial direction, as illustrated in FIG. 20.

This can result in evenly distributing oil discharged through the oil outlet 4262 into the rotor shaft bearing accommodating portion 192 and the inner shaft bearing accommodating portion 193.

The partition portion 194 may be provided with a separation rib 196 that protrudes inward along the radial direction and extends along the circumferential direction.

The separation rib 196 may be formed so that its thickness in the axial direction is reduced compared to the thickness of the partition part 194 in the axial direction.

The center of the separation rib 196 in the axial direction may be formed to be aligned with the center of the oil outlet 4262 in the axial direction.

This can result in more effectively distributing oil discharged through the oil outlet 4262 into the rotor shaft bearing accommodating portion 192 and the inner shaft bearing accommodating portion 193.

With the configuration, when an operation is started and power is applied to the stator coil 240, magnetic force is generated. Accordingly, the rotor 270 rotates around the rotor shaft 271 by interaction between magnetic force of the permanent magnet 283 and the magnetic force generated by the stator coil 240.

Rotational force of the rotor 270 is transmitted to each of the inner shafts 310 through the gear train 350.

Specifically, the rotational force of the rotor 270 is transmitted to the main gear 361 by the driving gear 351, the counter gear 353, and the power transmission gear 359 that are rotated in the engaged state.

The rotational force of the main gear 361 is transmitted to each of the inner shafts 310 through the planetary gears 371 and the sun gears 369.

Meanwhile, when the gear train 350 rotates, oil inside the housing 100 is scattered by the plurality of gears from the inside of the housing 100 to the outside along the radial direction.

The oil inside the housing 100 may fall to a preset height when a certain period of time elapses after the gear train 350 starts rotating.

Accordingly, rotational resistance due to a high level of the oil during the rotation of the gear train can be reduced.

Specifically, some of oil scattered by the ring gear 367 of the main gear 361 are in contact with the guide rib 415. The oil in contact with the guide rib 415 is introduced into the gear-side oil storage part 410 along the guide rib 415 due to viscosity of the oil and the action of gravity.

The gear-side oil storage part 410 is configured such that an amount of oil discharged through the oil outlet 4123 is smaller than an amount of oil introduced through the oil inlet 4122, and accordingly a considerable amount of oil is stored in the gear-side oil storage part 410. Accordingly, the oil inside the housing 100 can maintain a relatively low level compared to the state in which the motor 210 is stopped.

Some of the oil scattered inside the housing 100 may be collected in each of the oil collecting portion 421 and/or the counter gear oil storage portion 430.

The oil in the counter gear oil storage portion 430 comes into contact with the counter gear 353 to lubricate and cool the counter gear 353 and the driving gear 351.

The oil collected inside the oil collecting portion 421 moves into the oil accommodating portion 424 of the motor-side oil storage part 420 through the through hole 423.

A part of the oil inside the motor-side oil storage part 420 flows out through the oil outlet 425 of the oil accommodating portion 424 and is supplied to the stator 220. This can facilitate cooling of the stator 220.

Another part of the oil inside the motor-side oil storage part 420 moves toward the bearing accommodating part 190 of the cover housing 180 through the oil supply passage 426.

The oil moved toward the bearing accommodating part 190 is discharged to the cutout portion 195 of the partition portion 194 through the oil outlet 4262. A part of the oil discharged to the cutout portion 195 moves to the rotor shaft bearing accommodating portion 192, and another part moves to the inner shaft bearing accommodating portion 193.

The oil moved to the rotor shaft bearing accommodating portion 192 comes into contact with the rotor shaft bearing 290 and promotes cooling and lubrication of the rotor shaft bearing 290.

The oil moved to the inner shaft bearing accommodating portion 193 comes into contact with the inner shaft bearing 320 and promotes cooling and lubrication of the inner shaft bearing 320.

The foregoing description has been given of specific embodiments of the present disclosure. However, the present disclosure may be embodied in various forms without departing from the spirit or essential characteristics thereof, and thus the above-described embodiments should not be limited by the details of the detailed description.

In addition, even embodiments not listed in the detailed description should be interpreted within the scope of the technical idea defined in the appended claims. And, all changes and modifications included within the technical range of the claims and their equivalents should be embraced by the appended claims.

The invention claimed is:

1. A motor assembly comprising:
a housing;
a motor that is accommodated on one side in the housing along an axial direction;
a gear train that is disposed on another side in the housing along the axial direction;
oil that is accommodated inside the housing and brought into contact with the gear train; and
an oil storage part that temporarily stores some of oil moved upward when the gear train rotates,
wherein the oil storage part comprises an oil outlet that is formed to allow the oil stored therein to flow out by a preset amount,
wherein the motor comprises:
a stator; and
a rotor that has a rotor shaft and is disposed to be rotatable with respect to the stator,
wherein the housing comprises:
a main housing in which the stator is accommodated; and
a gear housing in which the gear train is accommodated,
wherein the oil storage part comprises a gear-side oil storage part that is disposed inside the gear housing,
wherein the gear-side oil storage part comprises:
an oil accommodation space that is formed in an arcuate shape with one side open in the axial direction, and has one side disposed above the gear housing and another side disposed below the gear housing; and
an oil cover that is coupled to block the opening of the oil accommodation space,
wherein the oil cover comprises an oil inlet that communicates with a top of the oil accommodation space,
wherein the oil outlet is formed in the oil cover to communicate with a bottom of the oil accommodation space, and
wherein the gear housing comprises a guide rib that has one side disposed above the gear train and another side disposed above the oil accommodation space.

2. The motor assembly of claim 1, wherein the guide rib comprises a first section disposed above the gear train in the axial direction, a second section disposed in the oil accommodation space in the axial direction, and a connection section connecting the first section and the second section.

3. The motor assembly of claim 2, wherein the first section and the second section are disposed with a height difference, and the connection section is inclined with respect to a radial direction.

4. The motor assembly of claim 1, wherein the oil storage part comprises a motor-side oil storage part disposed on a top inside the main housing,
wherein the motor-side oil storage part extends along the axial direction, and
wherein the oil outlet is formed in the motor-side oil storage part to be open toward the stator.

5. The motor assembly of claim 4, wherein the main housing comprises an inner wall that partitions a gear accommodating part to accommodate the gear train and a motor accommodating part to accommodate the motor, and
wherein the motor-side oil storage part comprises:
a through hole that is formed through the inner wall;
an oil collecting portion that is disposed below the through hole inside the gear accommodating part to collect oil and allows the collected oil to be discharged through the through hole; and
an oil accommodating portion that is disposed inside the motor accommodating part and accommodates oil discharged through the through hole.

6. The motor assembly of claim 5, wherein the oil accommodating portion comprises a bottom surface portion formed at a higher position than a center of the rotor shaft, and a side wall portion extending upward from the bottom surface portion and spaced apart from an upper surface of the main housing to form the oil outlet.

7. The motor assembly of claim 5, wherein the rotor shaft comprises rotor shaft bearings disposed on both sides along the axial direction, and
wherein the motor-side oil storage part comprises an oil supply passage to supply oil to the rotor shaft bearings.

8. The motor assembly of claim 7, wherein the oil supply passage is formed to be inclined downward, and
wherein an inlet side of the oil supply passage is connected to communicate with a bottom of the oil storage portion, and an outlet side of the oil supply passage is connected to communicate with an upper area of the rotor shaft bearing.

9. The motor assembly of claim 8, wherein the oil supply passage comprises a communication hole that communicates with outside.

10. The motor assembly of claim 8, wherein the rotor shaft comprises a through hole formed therethrough in the axial direction,
wherein the rotor shaft comprises therein an inner shaft that has one end portion connected to any one of the gear trains,
wherein the inner shaft extends to outside of the rotor shaft,
wherein the inner shaft comprises an inner shaft bearing,
wherein the main housing comprises a bearing accommodating part in which the rotor shaft bearing and the inner shaft bearing are accommodated, and
wherein the oil supply passage comprises an oil outlet communicating with the bearing accommodating part.

11. The motor assembly of claim 10, wherein the bearing accommodating part comprises a rotor shaft bearing accommodating portion in which the rotor shaft bearing is accommodated, an inner shaft bearing accommodating portion in which the inner shaft bearing is accommodated, and a partition portion partitioning the rotor shaft bearing accommodating portion and the inner shaft bearing accommodating portion,
- wherein the partition portion comprises a cutout portion formed by removing a partial section thereof in the circumferential direction, and
- wherein the oil outlet is formed in the cutout portion.

12. The motor assembly of claim 11, wherein the partition portion comprises a separation rib that protrudes along the radial direction and extends along the circumferential direction, such that oil introduced through the oil outlet flows separately into the rotor shaft bearing accommodating portion and the inner shaft bearing accommodating portion.

13. The motor assembly of claim 1, wherein the gear train comprises:
- a driving gear disposed on the rotor shaft;
- a counter gear engaged with the driving gear;
- a power transmission gear coaxially coupled to the counter gear; and
- a main gear engaged with the power transmission gear, and
- wherein the oil storage part comprises a counter gear oil storage portion disposed below the counter gear and accommodating oil therein.

14. The motor assembly of claim 13, wherein the counter gear oil storage portion comprises a bottom surface portion formed in an arcuate shape and disposed with being spaced apart from an outer periphery of the counter gear, and both side wall portions extending from both sides of the bottom surface portion in a radial direction to form an oil storage space therein.

15. The motor assembly of claim 13, wherein the gear train further comprises:
- a gear shaft having the counter gear and the power transmission gear; and
- a gear shaft bearing that rotatably supports the gear shaft,
- wherein the gear housing comprises a gear shaft bearing accommodating portion in which the gear shaft bearing is accommodated, and
- wherein the oil storage part comprises an oil supply part disposed above the gear shaft bearing accommodating portion.

16. The motor assembly of claim 15, wherein the oil supply part comprises:
- an oil accommodation space that is formed above the gear shaft bearing accommodating portion and has an end portion facing the motor open along the axial direction; and
- a cover that is coupled to block the opening of the oil accommodation space.

* * * * *